(12) United States Patent
Boon et al.

(10) Patent No.: US 9,667,998 B2
(45) Date of Patent: *May 30, 2017

(54) MOTION VIDEO PREDICT CODING METHOD, MOTION VIDEO PREDICT CODING DEVICE, MOTION VIDEO PREDICT CODING PROGRAM, MOTION VIDEO PREDICT DECODING METHOD, MOTION PREDICT DECODING DEVICE, AND MOTION VIDEO PREDICT DECODING PROGRAM

(71) Applicant: NTT DOCOMO, INC., Chiyoda-ku, Tokyo (JP)

(72) Inventors: Choong Seng Boon, Yokohama (JP); Yoshinori Suzuki, Saitama (JP); Thiow Keng Tan, Jalan Sindor (SG)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,808

(22) Filed: Aug. 30, 2016

(65) Prior Publication Data
US 2016/0373786 A1    Dec. 22, 2016

Related U.S. Application Data

(63) Continuation of application No. 14/255,728, filed on Apr. 17, 2014, which is a continuation of application No. PCT/JP2012/073090, filed on Sep. 10, 2012.

(30) Foreign Application Priority Data

Oct. 18, 2011   (JP) .................................. 2011-228758
Nov. 1, 2011   (JP) .................................. 2011-240334

(51) Int. Cl.
*H04N 7/12*      (2006.01)
*H04N 19/61*     (2014.01)
(Continued)

(52) U.S. Cl.
CPC .......... *H04N 19/61* (2014.11); *H04N 19/124* (2014.11); *H04N 19/13* (2014.11); *H04N 19/139* (2014.11);
(Continued)

(58) Field of Classification Search
None
See application file for complete search history.

(56) References Cited

U.S. PATENT DOCUMENTS

2006/0083298 A1* 4/2006 Wang ................... H04N 19/196
375/240.01

OTHER PUBLICATIONS

Sjoberg et al., Joint Collaborative Team on Video Coding (JOT-VC) of ITU-T SGl 6 WP3 and ISO/I EC JTC1/SC29/WG11,6th Meeting: Torino, 2011, Document: JCTVC-F493, WG 11 No. m20923.*
(Continued)

*Primary Examiner* — Dakshesh Parikh
(74) *Attorney, Agent, or Firm* — Brinks Gilson & Lione

(57) ABSTRACT

A video predictive coding system includes a video predictive encoding device having: an input circuit to receive pictures constituting a video sequence; an encoding circuit which conducts predictive coding of a target picture using, as reference pictures, pictures encoded and reconstructed in the past, to generate compressed picture data; a reconstruction circuit which decode the compressed picture data to reconstruct a reproduced picture; picture storage to store the reproduced picture as a reference picture for encoding of a subsequent picture; and a buffer management circuit which controls the picture storage, (prior to predictive encoding of the target picture), on the basis of buffer description information BD[k] related to reference pictures used in predictive encoding of the target picture, encodes the buffer description information BD[k] with reference to buffer description information BD[m] for a picture different from the target
(Continued)

picture, and adds encoded data thereof to the compressed picture data.

2 Claims, 24 Drawing Sheets

(51) Int. Cl.

| | | |
|---|---|---|
| H04N 19/463 | (2014.01) | |
| H04N 19/503 | (2014.01) | |
| H04N 19/70 | (2014.01) | |
| H04N 19/196 | (2014.01) | |
| H04N 19/124 | (2014.01) | |
| H04N 19/13 | (2014.01) | |
| H04N 19/15 | (2014.01) | |
| H04N 19/172 | (2014.01) | |
| H04N 19/139 | (2014.01) | |
| H04N 19/152 | (2014.01) | |
| H04N 19/159 | (2014.01) | |
| H04N 19/176 | (2014.01) | |
| H04N 19/625 | (2014.01) | |
| H04N 19/44 | (2014.01) | |
| H04N 19/52 | (2014.01) | |
| H04N 19/56 | (2014.01) | |
| H04N 19/433 | (2014.01) | |
| H04N 19/42 | (2014.01) | |

(52) U.S. Cl.
CPC ........... *H04N 19/15* (2014.11); *H04N 19/152* (2014.11); *H04N 19/159* (2014.11); *H04N 19/172* (2014.11); *H04N 19/176* (2014.11); *H04N 19/196* (2014.11); *H04N 19/44* (2014.11); *H04N 19/463* (2014.11); *H04N 19/503* (2014.11); *H04N 19/52* (2014.11); *H04N 19/56* (2014.11); *H04N 19/625* (2014.11); *H04N 19/70* (2014.11); *H04N 19/42* (2014.11); *H04N 19/433* (2014.11)

(56) References Cited

OTHER PUBLICATIONS

Kourtis et al., "Optimizing sparse matrix-vector multiplication using index and value compression", Proceeding CF '08 Proceedings of the 5th conference on Computing frontiers, pp. 87-96, ACM, New York, NY, USA ©2008.*
Office Action in corresponding Australian Application No. 201502850, dated Aug. 24, 2016, 3 pages.
Office Action in U.S. Appl. No. 14/255,728, dated Sep. 28, 2016, 16 pages.
Sjöberg et al., Joint Collaborative Team on Video Coding (JCT-VC) of ITU-T SG16 WP3 and ISO/IEC JTC1/SC29/WG11, 6$^{th}$ Meeting: Torino, 2011, Document: JCTVC-F493, WG 11 No. m20923.
Kourtis et al., "Optimizing Sparse Matrix-Vector Multiplication Using Index and Value Compression", *Proceeding CF '08 Proceedings of the 5$^{th}$ Conference on Computing Frontiers*, ACM, New York, NY, USA ©2008, pp. 87-96.
International Search Report, dated Dec. 4, 2012, pp. 1-3, issued in International Application No. PCT/JP2010/073090, Japanese Patent Office, Tokyo, Japan.
Rickard Sjöberg et al., Absolute signaling of reference pictures, dated Jul. 18, 2011, pp. 1-15, Sixth Meeting of the Joint Collaborative Team on Video Coding (JCT-VC) of ITU-T ST16 WP3 and ISO/IEC JTC1/SC29/WG11 6$^{th}$ Meeting: Torino, Italy, Jul. 14-22, 2011.
Australia Patent Examination Report No. 1, dated Dec. 15, 2014, pp. 1-3, issued in Australian Patent Application No. 2012324191, Offices of IP Australia, Woden ACT, Australia.

Taiwan IPO Search Report with translation, dated Jan. 13, 2015, pp. 1-2, issued in Taiwan Invention Patent Application No. 101137724, Taiwan Intellectual Property Office, Taipei City, Taiwan, R.O.C.
Bross, B., et al., "WD4: Working Draft 4 of High-Efficiency Video Coding" dated Jul. 14, 2011, pp. 1-216, Joint Collaboration Team on Video Coding (jct-vc) of ITU-T SG16 WP3 and ISO/IEC JTC1/SC29/WG11, 6$^{th}$ Meeting, Torino, Italy, XP030009800.
Tan, T.K. et al., "AHG21: Inter reference picture set prediction syntax and semantics," dated Nov. 21, 2011, pp. 1-10, Joint Collaborative Team on Video Coding (JCT-VC) of ITU-T SG16 WP3 and ISO/IEC JTC1/SC29/WG11, 7$^{th}$ Meeting, Geneva Switzerland, XP030050318.
Extended European Search Report, dated May 6, 2015, pp. 1-8, issued in European Patent Application No. 12841320.0, European Patent Office, Munich, Germany.
Korean Office Action with English translation, dated Jun. 1, 2015, pp. 1-6, issued in Korean Patent Application No. 10-2014-7013163, Korean Intellectual Property Office, Daejeon, Republic of Korea.
Russian Office Action with English translation, dated Jul. 8, 2015, pp. 1-8, issued in Russian Patent Application No. 2014119878, Rospatent, Federal Institute of Industrial Property, Moscow, Russian Federation.
Rickard Sjöberg et al., Absolute signaling of reference pictures, 6. JCT-VC Meeting, 97. MPEG Meeting; Jul. 1, 2011: pp. 1-10 Torino, Italy; (Joint Collaborative Team on Video Coding of ISO/IEC JTC1/SC29/WG11 and ITU-T SG. 16), No. JCTVC-F493, XP030009516.
Extended European Search Report, dated Sep. 24, 2015, pp. 1-10, issued in European Patent Application No. 15169324.9, European Patent Office, Munich Germany.
Extended European Search Report, dated Sep. 24, 2015, pp. 1-11, issued in European Patent Application No. 15169334.8, European Patent Office, Munich Germany.
Extended European Search Report, dated Sep. 24, 2015, pp. 1-11, issued in European Patent Application No. 15169341.3, European Patent Office, Munich Germany.
Extended European Search Report, dated Sep. 24, 2015, pp. 1-9, issued in European Patent Application No. 15169351.2, European Patent Office, Munich Germany.
Canadian Office Action, dated Oct. 27, 2015, pp. 1-4, issued in Canadian Patent Application No. 2,852,888, Canadian Intellectual Property Office, Gatineau, Quebec, Canada.
European Office Action, dated Nov. 24, 2015, pp. 1-6, issued in European Patent Application No. 12841320.0, European Patent Office, Munich, Germany.
Australian Office Action, dated Mar. 30, 2016, pp. 1-3, issued in Australian Patent Application No. 2015202845, Australian Patent Office, Woden ACT, Australia.
Australian Office Action, dated Apr. 21, 2016, pp. 1-3, issued in Australian Patent Application No. 2015202847, Australian Patent Office, Woden ACT, Australia.
Canadian Office Action, dated Apr. 20, 2016, pp. 1-3, issued in Canadian Patent Application No. 2,852,888, Canadian Intellectual Property Office, Gatineau, Quebec, Canada.
European Office Action, dated May 11, 2016, pp. 1-10, issued in European Patent Application No. 12841320.0, European Patent Office, Munich, Germany.
Office Action and English language translation thereof, in corresponding Taiwanese Application No. 104111245, dated Apr. 27, 2016, 14 pages.
Office Action in corresponding European Application No. 15169351.2, dated Jun. 22, 2016, 7 pages.
Office Action, and English language translation thereof, in corresponding Chinese Application No. 201280050657.8, dated Jul. 1, 2016, 14 pages.
Office Action in U.S. Appl. No. 15/251,842, dated Nov. 10, 2016, 27 pages.
Office Action in U.S. Appl. No. 15/251,876, dated Nov. 8, 2016, 26 pages.

(56) References Cited

OTHER PUBLICATIONS

Office Action, and English language translation thereof, in corresponding Chinese Application No. 201280050657.8, dated Jan. 26, 2017, 12 pages.

* cited by examiner

Fig.5

| bd_idx | NUMBER OF ΔPOCk | | i=0 | i=1 | i=2 | i=3 | i=4 | i=5 | mk | ΔBDk |
|---|---|---|---|---|---|---|---|---|---|---|
| k=0 | 4 | BD for frame with POC = 32 (in ΔPOC) | -14 | -12 | -10 | -8 | | | | |
| k=1 | 3 | BD for frame with POC = 28 (in Δidx) | 2 | 0 | 0 | | | | 0 | 4 |
| k=2 | 4 | BD for frame with POC = 26 (in Δidx) | 0 | 0 | 0 | 0 | | | 1 | 2 |
| k=3 | 5 | BD for frame with POC = 30 (in Δidx) | 0 | 0 | 0 | 0 | 0 | | 2 | -4 |
| k=4 | 6 | BD for frame with POC = 25 (in Δidx) | 0 | 0 | 0 | 0 | 0 | 0 | 3 | 5 |
| k=5 | 5 | BD for frame with POC = 27 (in Δidx) | 1 | 0 | 0 | 0 | 0 | | 4 | -2 |
| k=6 | 4 | BD for frame with POC = 29 (in Δidx) | 1 | 0 | 0 | 0 | | | 5 | -2 |
| k=7 | 4 | BD for frame with POC = 31 (in Δidx) | 0 | 0 | 0 | 0 | | | 6 | -2 |

Fig.9

| TARGET FRAME (NUMBERS DESIGNATE POC NUMBERS) | REFERENCE FRAMES IN DPB (NUMBERS DESIGNATE POC NUMBERS) | | | | | | |
|---|---|---|---|---|---|---|---|
| 32 | | | | | | | |
| 28 | 18 | 20 | 22 | 24 | | | |
| 26 | 22 | 24 | | | | | |
| 25 | 22 | 24 | 32 | 28 | | | |
| 30 | 22 | 24 | 32 | 28 | | | |
| 27 | 24 | 24 | 32 | 28 | 26 | | |
| 29 | 32 | 32 | 28 | 26 | 26 | 30 | |
| 31 | 32 | 28 | 26 | 26 | 30 | | |

Fig. 15

| 1510 |
| --- |
| NUMBER OF BDs — 1511 |
| 1530  [#ΔPOC₀]  [ΔPOC₀,₀,D_ID₀,₀] [ΔPOC₀,₁,D_ID₀,₁] [ΔPOC₀,₂,D_ID₀,₂] ...... [ΔPOC₀,ᵢ,D_ID₀,ᵢ] — 1520, 1531, 1532, 1522 |
| 1533  [#ΔPOC₁]  [ΔPOC₁,₀,D_ID₁,₀] [ΔPOC₁,₁,D_ID₁,₁] [ΔPOC₁,₂,D_ID₁,₂] ...... [ΔPOC₁,ᵢ,D_ID₁,ᵢ] — 1524 |
| ...... |
| 1534  [#ΔPOCₖ]  [ΔPOCₖ,₀,D_IDₖ,₀] [ΔPOCₖ,₁,D_IDₖ,₁] [ΔPOCₖ,₂,D_IDₖ,₂] ...... [ΔPOCₖ,ᵢ,D_IDₖ,ᵢ] |

Fig. 16

| TARGET FRAME (NUMBERS DESIGNATE POC NUMBERS) | REFERENCE FRAMES IN DPB (NUMBERS DESIGNATE POC NUMBERS) | | | | | | |
|---|---|---|---|---|---|---|---|
| 32 | | | | | | | |
| 28 | 18 | 20 | 22 | 24 | | | |
| 26 | 22 | 24 | 32 | 28 | | | |
| 30 | 22 | 24 | 32 | 28 | | | |
| 25 | 22 | 24 | 32 | 28 | 26 | | |
| 27 | 24 | 32 | 28 | 26 | 26 | | |
| 29 | 32 | 28 | 26 | 30 | 30 | | |
| 31 | 32 | 28 | 26 | 30 | 30 | | |

Fig. 17

| bd_idx | NUMBER OF ΔPOCk | | i=0 | i=1 | i=2 | i=3 | i=4 | i=5 |
|---|---|---|---|---|---|---|---|---|
| k=0 | 4 | BD for frame with POC = 32 (in ΔPOC) | -14 | -12 | -10 | -8 | | |
| k=1 | 3 | BD for frame with POC = 28 (in ΔPOC) | -6 | -4 | 4 | | | |
| k=2 | 4 | BD for frame with POC = 26 (in ΔPOC) | -4 | -2 | 6 | 2 | | |
| k=3 | 5 | BD for frame with POC = 30 (in ΔPOC) | -8 | -6 | 2 | -2 | -4 | |
| k=4 | 6 | BD for frame with POC = 25 (in ΔPOC) | -3 | -1 | -7 | 3 | 1 | 5 |
| k=5 | 5 | BD for frame with POC = 27 (in ΔPOC) | -3 | -5 | 1 | -1 | 3 | |
| k=6 | 4 | BD for frame with POC = 29 (in ΔPOC) | -1 | -1 | -3 | 1 | | |
| k=7 | 4 | BD for frame with POC = 31 (in ΔPOC) | -1 | -3 | -5 | -1 | | |

Fig.20

| bd_idx | NUMBER OF ΔPOCk | | i=0 | i=1 | i=2 | i=3 | i=4 | i=5 |
|---|---|---|---|---|---|---|---|---|
| k=0 | 4 | BD for frame with POC = 32 (in ΔPOC) | -14 | -12 | -10 | -8 | | |
| k=1 | 3 | BD for frame with POC = 28 (in ΔPOC) | -6 | -4 | 4 | 2 | 1 | |
| k=2 | 4 | BD for frame with POC = 26 (in ΔPOC) | -4 | -2 | 6 | 3 | -4 | |
| k=3 | 6 | BD for frame with POC = 25 (in ΔPOC) | -3 | -1 | 7 | -2 | 3 | 5 |
| k=4 | 5 | BD for frame with POC = 30 (in ΔPOC) | -8 | -6 | -2 | -1 | | |
| k=5 | 5 | BD for frame with POC = 27 (in ΔPOC) | -3 | 5 | 1 | 1 | | |
| k=6 | 4 | BD for frame with POC = 29 (in ΔPOC) | -3 | -1 | -3 | -1 | | |
| k=7 | 4 | BD for frame with POC = 31 (in ΔPOC) | 1 | -3 | -5 | -1 | | |

Fig. 21

| bd_idx | NUMBER OF ΔPOC$_k$ | | i=0 | i=1 | i=2 | i=3 | i=4 | i=5 | m$_k$ | ΔBD$_k$ |
|---|---|---|---|---|---|---|---|---|---|---|
| k=0 | 4 | BD for frame with POC = 32 (in ΔPOC) | -14 | -12 | -10 | -8 | | | | |
| k=1 | 3 | BD for frame with POC = 28 (in Δidx, |BDR$_{k,i}$|) | 2 | 0 | {0,0} | | | | 0 | 4 |
| k=2 | 4 | BD for frame with POC = 26 (in Δidx or {Δidx, |BDR$_{k,i}$|}) | 0 | 0 | 0 | {0,0} | | | 1 | 2 |
| k=3 | 6 | BD for frame with POC = 25 (in Δidx or {Δidx, |BDR$_{k,i}$|}) | 0 | 0 | 0 | 0 | {0,0} | {0,4} | 2 | 1 |
| k=4 | 5 | BD for frame with POC = 30 (in Δidx) | 0 | 0 | 0 | 0 | 0 | | 3 | -5 |
| k=5 | 5 | BD for frame with POC = 27 (in Δidx) | 1 | 0 | 0 | 0 | 0 | | 3 | -2 |
| k=6 | 4 | BD for frame with POC = 29 (in Δidx) | 1 | 0 | 0 | 0 | | | 5 | -2 |
| k=7 | 4 | BD for frame with POC = 31 (in Δidx) | 0 | 0 | 0 | 0 | | | 6 | -2 |

MOTION VIDEO PREDICT CODING METHOD, MOTION VIDEO PREDICT CODING DEVICE, MOTION VIDEO PREDICT CODING PROGRAM, MOTION VIDEO PREDICT DECODING METHOD, MOTION PREDICT DECODING DEVICE, AND MOTION VIDEO PREDICT DECODING PROGRAM

This application is a continuation of U.S. application Ser. No. 14/255,728, filed Apr. 17, 2014, which is a continuation of PCT/JP2012/073090, filed Sep. 10, 2012, which claims the benefit of the filing date pursuant to 35 U.S.C. §119(e) of JP2011-228758, filed Oct. 18, 2011 and JP2011-240334, filed Nov. 1, 2011, all of which are incorporated herein by reference.

TECHNICAL FIELD

The present disclosure relates to a video predictive encoding method, device and program, and a video predictive decoding method, device and program, and more particularly, to a description in a buffer for reference pictures to be used in inter-frame predictive encoding.

BACKGROUND ART

Compression coding technologies are used for efficient transmission and storage of video data. The techniques defined in MPEG-1 to 4 and ITU (International Telecommunication Union) H.261 to H.264 are commonly used for video data.

SUMMARY

Using encoding techniques, a picture which is used as an encoding target is divided into a plurality of blocks and then an encoding process and a decoding process are carried out on a block basis. Predictive encoding methods as described below are used in order to improve encoding efficiency. In intra-frame predictive encoding, a predicted signal is generated using a previously-reproduced neighboring picture signal (a reconstructed signal reconstructed from picture data compressed in the past) present in the same frame as a target block, and then a residual signal obtained by subtracting the predicted signal from a signal of the target block is encoded. In inter-frame predictive encoding, a displacement of signal is searched for with reference to a previously-reproduced picture signal present in a frame different from a target block, a predicted signal is generated with compensation for the displacement, and a residual signal obtained by subtracting the predicted signal from the signal of the target block is encoded. The previously-reproduced picture used for reference for the motion search and compensation is referred to as a reference picture.

In inter-frame predictive encoding, such as, for example, in H.264, the predicted signal for the target block is selected by performing the motion search with reference to a plurality of reference pictures having been encoded and then reproduced in the past, and defining a picture signal with the smallest error as an optimum predicted signal. A difference is calculated between the pixel signal of the target block and this optimum predicted signal, which is then subjected to a discrete cosine transform, quantization, and entropy encoding. At substantially the same time, also encoded is information about the reference picture from which the optimum predicted signal for the target block is derived (which will be referred to as "reference index") and information about the region of the reference picture from which the optimum predicted signal is derived (which will be referred to as "motion vector"). In H.264, for example, reproduced pictures are stored as four to five reference pictures in a frame memory or reproduced picture buffer (or decoded picture buffer, which can also be referred to as "DPB").

A general method for management of a plurality of reference pictures is a technique of releasing, from the buffer, a region occupied by the oldest reference picture (i.e., a picture having been stored in the buffer for the longest time) out of a plurality of reproduced pictures, and storing a reproduced picture having been decoded last, as a reference picture. On the other hand, a reference picture management method, such as the example method described in Rickard Sjoberg, Jonatan Samuelsson, "Absolute signaling of reference pictures," Joint Collaborative Team on Video Coding, JCTVC-F493, Torino, 2011 may be used to flexibly prepare optimum reference pictures for a target picture, in order to enhance efficiency of inter-frame prediction.

Buffer description information to describe a plurality of reference pictures to be stored in the buffer can be added to encoded data of each target picture, and can then be encoded, such as in an example described by Rickard Sjoberg, Jonatan Samuelsson, "Absolute signaling of reference pictures," Joint Collaborative Team on Video Coding, JCTVC-F493, Torino, 2011. Identifiers of the reference pictures necessary for processing (encoding or decoding) of the target picture and subsequent pictures can be described in this buffer description information. In an encoding device or a decoding device, the buffer can be managed so that designated reproduced pictures are stored in the buffer (frame memory), in accordance with the buffer description information. On the other hand, any reproduced picture not designated can be deleted from the buffer.

The buffer description information about each target picture may be sent by being added to the header of compressed data of each target picture, or pieces of buffer description information about a plurality of target pictures may be sent together as part of a PPS (picture parameter set) information carrying parameters of the decoding process applied in common. FIG. 15 is a schematic diagram showing an example of buffer description information described in a PPS. Although the PPS contains information other than the buffer description information, the other information is omitted herein. Described in the PPS information 1510 are the number 1511 of buffer descriptions (each of which will also be referred to hereinafter as "BD"), and pieces of information (1520, 1522, 1524) about the BDs as many as the number. Described in the information about each BD (the k-th BD will be referred to as BD[k]) are the number 1530 of reference pictures stored in the buffer, and information (1531, 1532) to identify which reference picture is to be stored. Information used to identify each reference picture is a POC (picture output count) indicative of an order of output of the picture to the outside. Described herein instead of direct use of the POC number is $\Delta POC_{k,j}$ (the j-th component in the k-th BD) which is a difference between the POC number of the reference picture and the POC number of the processing target picture. Also sent is $D\_ID_{k,j}$, which is indicative of dependence of the reference picture on other pictures. The smaller the value of $D\_ID_{k,j}$, the more pictures for which reproduction is dependent on the reference picture; on the other hand, the larger this value, the smaller the influence on other pictures. If $D\_ID_{k,j}$ of a reference picture is the largest value, the reference picture is not needed for reproduction of other pictures and therefore does not have to be stored as a reference picture. In an example, conventional technology can be configured to send the buffer description BD[k] in the form of the information of the value (#$\Delta POC_k$) indicative of the number of reference pictures and {$\Delta POC_{k,j}$, $D\_ID_{k,j}$} for each of the number of reference pictures, from the transmission side to the reception side.

FIG. 16 shows an example of a state of target pictures and reference pictures in the buffer DPB in processing of the respective target pictures. A POC number to identify a picture is written in each cell. For example, row 1610 means that in processing (encoding or decoding) of a target picture with POC=32, reference pictures with POC=18, 20, 22, and 24 are stored in the DPB. FIG. 17 shows an example of buffer description information obtained by applying, for example, conventional technology to the state of target pictures and reference pictures in the buffer DPB of FIG. 16. Each of cells under 1704 indicates a value of $\Delta POC_{k,j}$.

In video encoding and decoding, reference can be made to an identical picture by a plurality of target pictures. In other words, the same reference picture can be used multiple times (repeatedly). It is seen from FIG. 16 that the reference picture with POC=32 enclosed in dashed line 1603 is referenced by the target pictures with POC=28, 26, 30, 25, 27, 29, and 31. It is also seen from the values in the respective cells under 1602 in FIG. 16 that the reference pictures with POC=22, 24, 28, 26, and 30 are also used multiple times.

In the buffer description information based on an example of conventional technology, however, $\Delta POC_{k,j}$ is independently determined in each BD[k], and for this reason, even for the same reference picture, $\Delta POC_{k,j}$ thereof is described in each BD[k]; therefore, the same information must be repeatedly transmitted and received, in spite of it being the same as previously transmitted and received information. This will be explained using the example of FIG. 16 and FIG. 17. The values in the respective cells enclosed in dashed line 1705 correspond to the POC numbers of the respective cells enclosed in dashed line 1603 in FIG. 16. Although the values in dashed line 1603 all represent the reference picture with POC=32, the values of $\Delta POC_{k,j}$ in dashed line 1705 all are different. Since these values of $\Delta POC_{k,j}$ are largely different, it is necessary to encode them using many bits. Therefore, an example conventional technology may have a problem that the same information has to be repeatedly transmitted and received using many bits, in order to transmit the buffer description information.

A video predictive coding system includes a video predictive encoding device comprising: input means which implements input of a plurality of pictures constituting a video sequence; encoding means which conducts predictively coding of a target picture to generate compressed picture data, using, as reference pictures, a plurality of pictures which have been encoded and then decoded and reproduced in the past; reconstruction means which decodes the compressed picture data to reconstruct a reproduced picture; picture storage means which stores at least one aforementioned reproduced picture as a reference picture to be used for encoding of a subsequent picture; and buffer management means which controls the picture storage means, wherein (prior to processing of the target picture), the buffer management means controls the picture storage means on the basis of buffer description information BD[k] relating to a plurality of reference pictures to be used in predictive encoding of the target picture and, at substantially the same time, the buffer management means encodes the buffer description information BD[k], with reference to buffer description information BD[m] for another picture different from the target picture, and thereafter adds the encoded data thereof to the compressed picture data.

Furthermore, the video predictive coding system includes a video predictive decoding device comprising: input means which implements input of compressed picture data for each of a plurality of pictures constituting a video sequence, the compressed picture data containing data resulting from predictive coding using a plurality of reference pictures, which have been decoded and reproduced in the past, and encoded data of buffer description information BD[k] related to the plurality of reference pictures; reconstruction means which decodes the compressed picture data to reconstruct a reproduced picture; picture storage means which stores at least one aforementioned reproduced picture as a reference picture to be used for decoding of a subsequent picture; and buffer management means which controls the picture storage means, wherein (prior to reconstruction of the reproduced picture), the buffer management means decodes the encoded data of the buffer description information BD[k] for the reproduced picture, with reference to buffer description information BD[m] for another picture different from the reproduced picture, and then controls the picture storage means on the basis of the decoded buffer description information BD[k].

The encoding and decoding methods of the buffer description information according to the video predictive coding system make use of the property of repeatedly using the same reference picture in the predictive encoding and decoding processes for a plurality of pictures, so as to use the correlation between pieces of buffer description information BD[k] used for different pictures, in order to reduce redundant information, thereby achieving the effect of efficient encoding of the buffer description information. In addition, the information specific to each reference picture (dependence information) can be the same as that of the referenced picture and therefore the information can be inherited as it is, thereby achieving the advantage of no need for encoding and decoding it again.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The video predictive coding system, may be better understood with reference to the following drawings and description. The components in the figures are not necessarily to scale, emphasis instead being placed upon illustrating the principles of the system. Moreover, in the figures, like referenced numerals designate corresponding parts throughout the different views.

FIG. 5 is a table showing an example of buffer description information generated by the buffer management method used in an embodiment.

FIG. 9 is another example showing a state of target pictures and reference pictures in the buffer DPB in processing of the respective target pictures.

FIG. 15 is a schematic diagram showing an example of buffer description information described in a PPS.

FIG. 16 is an example showing a state of target pictures and reference pictures in the buffer DPB in processing of the respective target pictures.

FIG. 17 is a table showing an example of the buffer description information obtained from the example of FIG. 16.

FIG. 20 is a table showing an example of buffer description information obtained from the example of FIG. 9.

FIG. 21 is a table showing an example of the buffer description information obtained from the example of FIG. 20, based on a buffer management method used in an embodiment.

DESCRIPTION OF EMBODIMENTS

Figure 1:
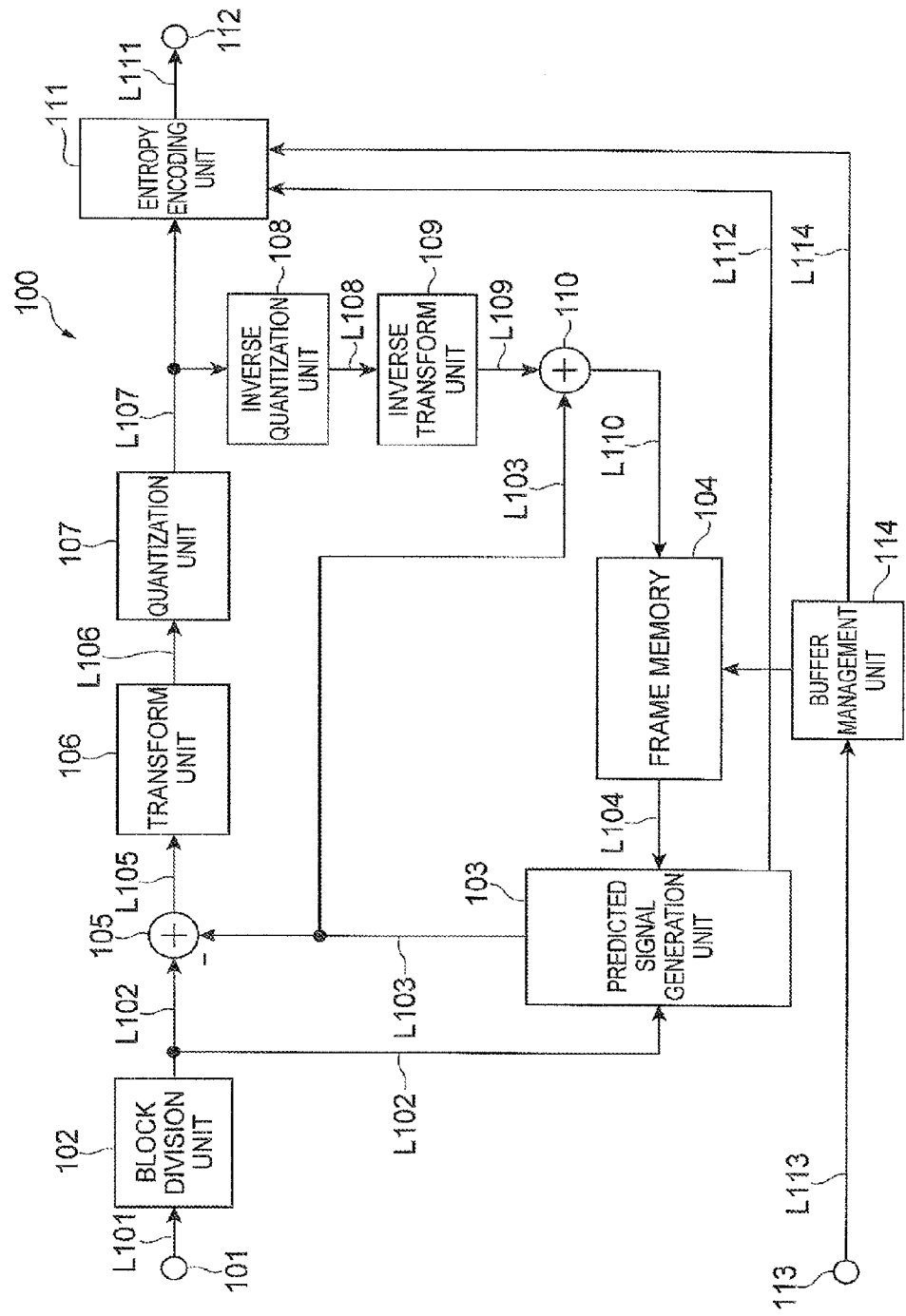
FIG. 1 is a block diagram showing an example of a video predictive encoding device according to an embodiment of the predictive video coding system.

Embodiments of the video predictive coding system will be described below using FIGS. 1 to 24. FIG. 1 is a block diagram showing an example video predictive encoding device 100 according to an embodiment. As shown in FIG. 1, the video predictive encoding device 100 is provided with circuitry that includes an input terminal 101, a block division unit 102, a predicted signal generation unit 103, a frame memory (or buffer, which will also be referred to as DPB) 104, a subtraction unit 105, a transform unit 106, a quantization unit 107, an inverse quantization unit 108, an inverse transform unit 109, an addition unit 110, an entropy encoding unit 111, an output terminal 112, and a buffer management unit 114. The subtraction unit 105, transform unit 106, and quantization unit 107 can correspond to an encoding unit or circuit. The inverse quantization unit 108, inverse transform unit 109, and addition unit 110 can correspond to a reconstruction unit or circuit. As used herein, the term "unit" may be interchangeable with the term "circuit" to describe hardware that may also use software to perform the described functionality. The video predictive coding device 100 may be a computing device or computer, including circuitry in the form of hardware, or a combination of hardware and software, capable of performing the described functionality. The video predictive coding device 100 may be one or more separate systems or devices included in the video predictive coding system, or may be combined with other systems or devices within the video predictive coding system. In other examples, fewer or additional blocks may be used to illustrate the functionality of the predictive video encoding device 100.

An example of the operation of the video predictive encoding device 100 will be described. A video signal consisting of a plurality of pictures can be fed to the input terminal 101. A picture of an encoding target is divided into a plurality of regions by the block division unit 102. In an embodiment, the target picture is divided into blocks each consisting of 8×8 pixels, but it may be divided into blocks of any size or shape other than the foregoing in other embodiments. A predicted signal is then generated for a region as a target of an encoding process (which will be referred to hereinafter as a target block). The embodiment can employ two types of prediction methods, the inter-frame prediction and the intra-frame prediction.

In an example of the inter-frame prediction, reproduced pictures having been encoded and thereafter reconstructed in the past are used as reference pictures and motion information to provide the predicted signal with the smallest difference from the target block is determined from the reference pictures. Depending upon situations, it is also allowable to subdivide the target block into sub-regions and determine an inter-frame prediction method for each of the sub-regions. In this case, an example efficient division method for the entire target block and motion information of each sub-region can be determined by various division methods. In an embodiment, the operation is carried out in the predicted signal generation unit 103, the target block is fed via line L102, and the reference pictures are fed via L104. The reference pictures to be used herein are a plurality of pictures which have been encoded and reconstructed in the past. An example of the details of the reconstruction and encoding are similar to the method of H.264 which is an example of conventional technology. The motion information and sub-region division method determined as described above are fed via line L112 to the entropy encoding unit 111 to be encoded thereby and then the encoded data is output from the output terminal 112. Information (reference index) indicative of which reference picture from among the plurality of reference pictures the predicted signal is derived is also sent via line L112 to the entropy encoding unit 111. In an embodiment, three to six reproduced pictures are stored in the frame memory 104 to be used as reference pictures. The predicted signal generation unit 103 derives reference picture signals from the frame memory 104, based on the reference pictures and motion information, which correspond to the sub-region division method and each sub-region, and generates the predicted signal. The inter-frame predicted signal generated in this manner is fed via line L103 to the subtraction unit 105.

In the intra-frame prediction, an intra-frame predicted signal is generated using previously-reproduced pixel values spatially adjacent to the target block. Specifically, the predicted signal generation unit 103 derives previously-reproduced pixel signals in the same frame as the target block from the frame memory 104 and extrapolates these signals to generate the intra-frame predicted signal. The information about the method of extrapolation is fed via line L112 to the entropy encoding unit 111 to be encoded thereby and then the encoded data is output from the output terminal 112. The intra-frame predicted signal generated in this manner is fed to the subtraction unit 105. The method of generating the intra-frame predicted signal in the predicted signal generation unit 103 can be, for example, similar to the method of H.264, which is an example of conventional technology. The predicted signal with the smallest difference is selected from the inter-frame predicted signal and the intra-frame predicted signal obtained as described above, and the selected predicted signal is fed to the subtraction unit 105.

The subtraction unit 105 subtracts the predicted signal (fed via line L103) from the signal of the target block (fed via line L102) to generate a residual signal. This residual signal is transformed by a discrete cosine transform by the transform unit 106 and the resulting transform coefficients are quantized by the quantization unit 107. Finally, the entropy encoding unit 111 encodes the quantized transform coefficients and the encoded data is output along with the information about the prediction method from the output terminal 112.

For the intra-frame prediction or the inter-frame prediction of the subsequent target block, the compressed signal of the target block is subjected to inverse processing to be reconstructed. For example, the quantized transform coefficients are inversely quantized by the inverse quantization unit 108 and then transformed by an inverse discrete cosine transform by the inverse transform unit 109, to reconstruct a residual signal. The addition unit 110 adds the reconstructed residual signal to the predicted signal fed via line L103 to reproduce a signal of the target block and the reproduced signal is stored in the frame memory 104. The present embodiment employs the transform unit 106 and the inverse transform unit 109, but it is also possible to use other transform processing instead of these transform units. In some situations, the transform unit 106 and the inverse transform unit 109 may be omitted.

The frame memory 104 is a finite storage, and storage of all reproduced pictures is beyond the scope of this discussion. Accordingly, only reproduced pictures to be used in encoding of the subsequent picture are described as being stored in the frame memory 104. A unit to control this frame memory 104 is the buffer management unit 114. Input data which is received through an input terminal 113 includes: information indicative of an output order of each picture (POC, picture output count), dependence information (dependency ID) related to $D\_ID_{k,j}$ which is indicative of dependence on the picture in predictive encoding of other pictures, and a type of encoding of the picture (intra-frame predictive encoding or inter-frame predictive encoding); and the buffer management unit 114 operates based on this information. Buffer description information generated by the buffer management unit 114 and the POC information of each picture is fed via line L114 to the entropy encoding unit 111 to be encoded thereby, and the encoded data is output together with the compressed picture data. The processing method of the buffer management unit 114 will be described later.

Figure 2:
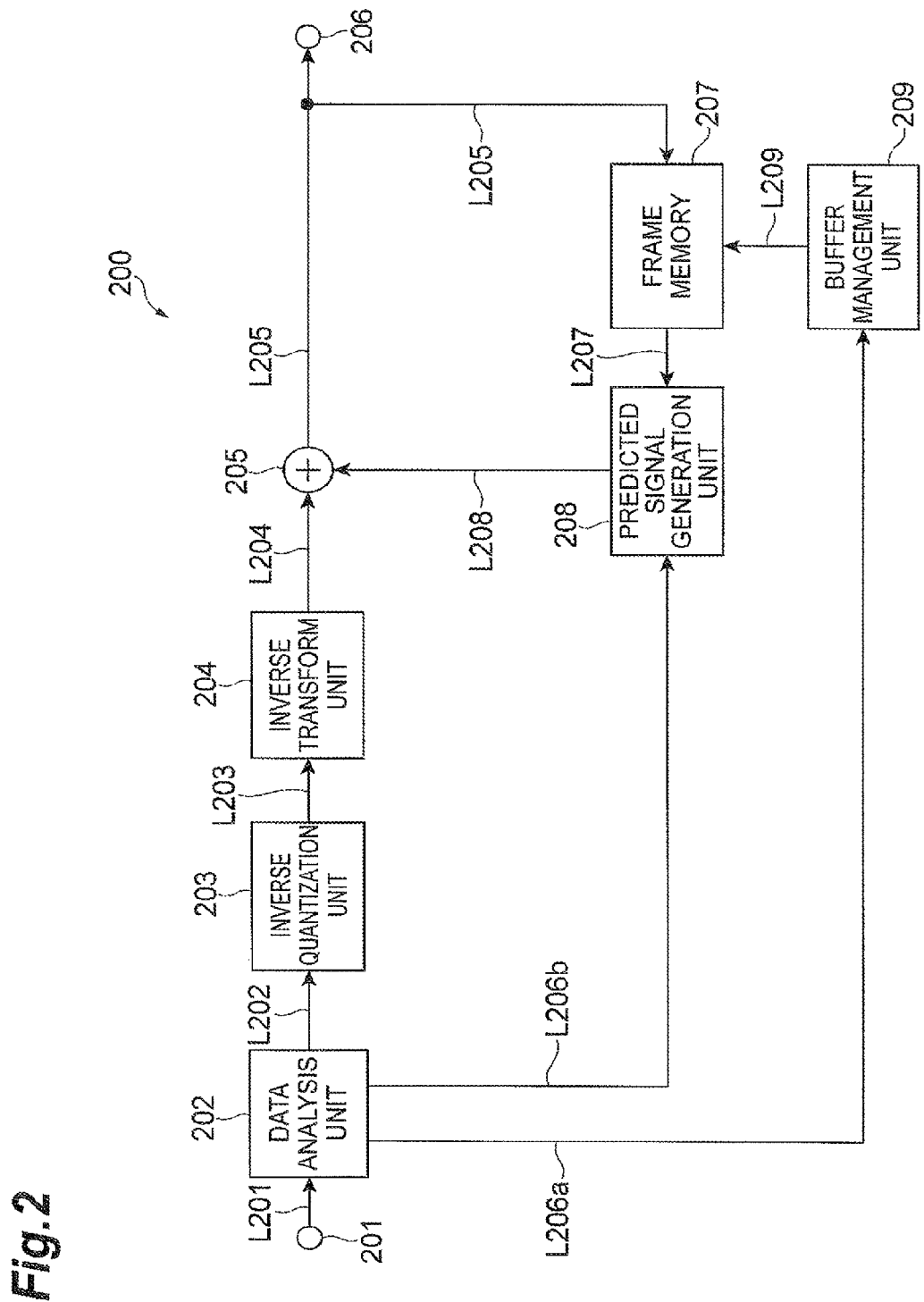
FIG. 2 is a block diagram showing an example of a video predictive decoding device according to an embodiment of the predictive video coding system.

Next, a video predictive decoding method of the predictive video coding system will be described. FIG. 2 is a block diagram of an example of a video predictive decoding device 200 according to an embodiment the predictive video coding system. As shown in FIG. 2, the video predictive decoding device 200 is provided with circuitry that includes an input terminal 201, a data analysis unit 202, an inverse quantization unit 203, an inverse transform unit 204, an addition unit 205, a predicted signal generation unit 208, a frame memory 207, an output terminal 206, and a buffer management unit 209. The inverse quantization unit 203 and the inverse transform unit 204 can correspond to a "reconstruction circuit". The reconstruction circuit may be means other than the above. Furthermore, the inverse transform unit 204 may be omitted. The video predictive decoding device 200 may be a computing device or computer, including circuitry in the form of hardware, or a combination of hardware and software, capable of performing the described functionality. The video predictive decoding device 200 may be one or more separate systems or devices included in the video predictive coding system, or may be combined with other systems or devices within the video predictive coding system. In other examples, fewer or additional blocks may be used to illustrate the functionality of the predictive video decoding device 200.

Concerning the video predictive decoding device 200 configured as described above, an example of the operation thereof will be described below. Compressed data resulting from compression encoding by the aforementioned method is input through the input terminal 201. This compressed data contains the residual signal resulting from predictive encoding of each target block obtained by division of a picture into a plurality of blocks, and the information related to the generation of the predicted signal. The information related to the generation of the predicted signal includes the information about block division (size of block), the motion information, and the aforementioned POC information in the case of the inter-frame prediction, and includes the information about the extrapolation method from previously-reproduced surrounding pixels in the case of the intra-frame prediction. The compressed data also contains the buffer description information for control of the frame memory 207.

The data analysis unit 202 extracts the residual signal of the target block, the information related to the generation of the predicted signal, the quantization parameter, and the POC information of the picture from the compressed data. The residual signal of the target block is inversely quantized on the basis of the quantization parameter (fed via line L202) by the inverse quantization unit 203. The result is transformed by the inverse transform unit 204 using an inverse discrete cosine transform.

Next, the information related to the generation of the predicted signal is fed via line L206b to the predicted signal generation unit 208. The predicted signal generation unit 208 accesses the frame memory 207, based on the information related to the generation of the predicted signal, to derive a reference signal from a plurality of reference pictures to generate a predicted signal. This predicted signal is fed via line L208 to the addition unit 205, the addition unit 205 adds this predicted signal to the reconstructed residual signal to reproduce a target block signal, and the signal is output via line L205 and simultaneously stored into the frame memory 207.

Reproduced pictures to be used for decoding and reproduction of the subsequent picture are stored in the frame memory 207. The buffer management unit 209 controls the frame memory 207. The buffer management unit 209 operates based on the buffer description information and the picture encoding type fed via line L206a. A control method of the buffer management unit 209 according to embodiments of the predictive video coding system will be described later.

Next, example operations of the buffer management unit (114 in FIGS. 1 and 209 in FIG. 2) will be described using FIGS. 3 and 4. The buffer management unit according to an embodiment manages the reference pictures stored in the frame memory (104, 207), in the following manner. For example, the encoder side generates pieces of buffer description information for respective target pictures together and sends them as part of PPS (picture parameter set) information carrying parameters of the decoding process applied in common. The decoder side extracts from the PPS information the pieces of buffer description information sent together, and performs the decoding and reproduction processing after preparing reference pictures in the frame memory, based on one piece of buffer description information designated in compressed data of each target picture. Any reference picture not described in the buffer description information is deleted from the frame memory and cannot be used as a reference picture thereafter.

Figure 3:
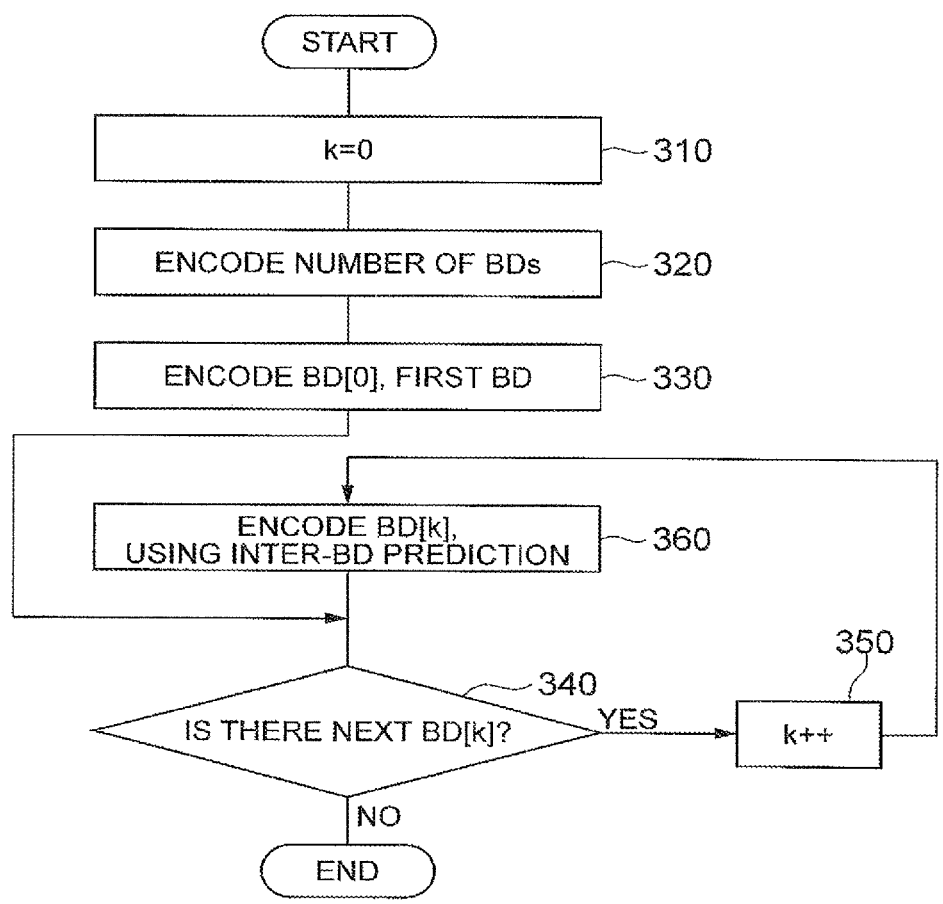
FIG. 3 is a flowchart showing an example of a buffer management method in the video predictive encoding device according to an embodiment.
Figure 8:
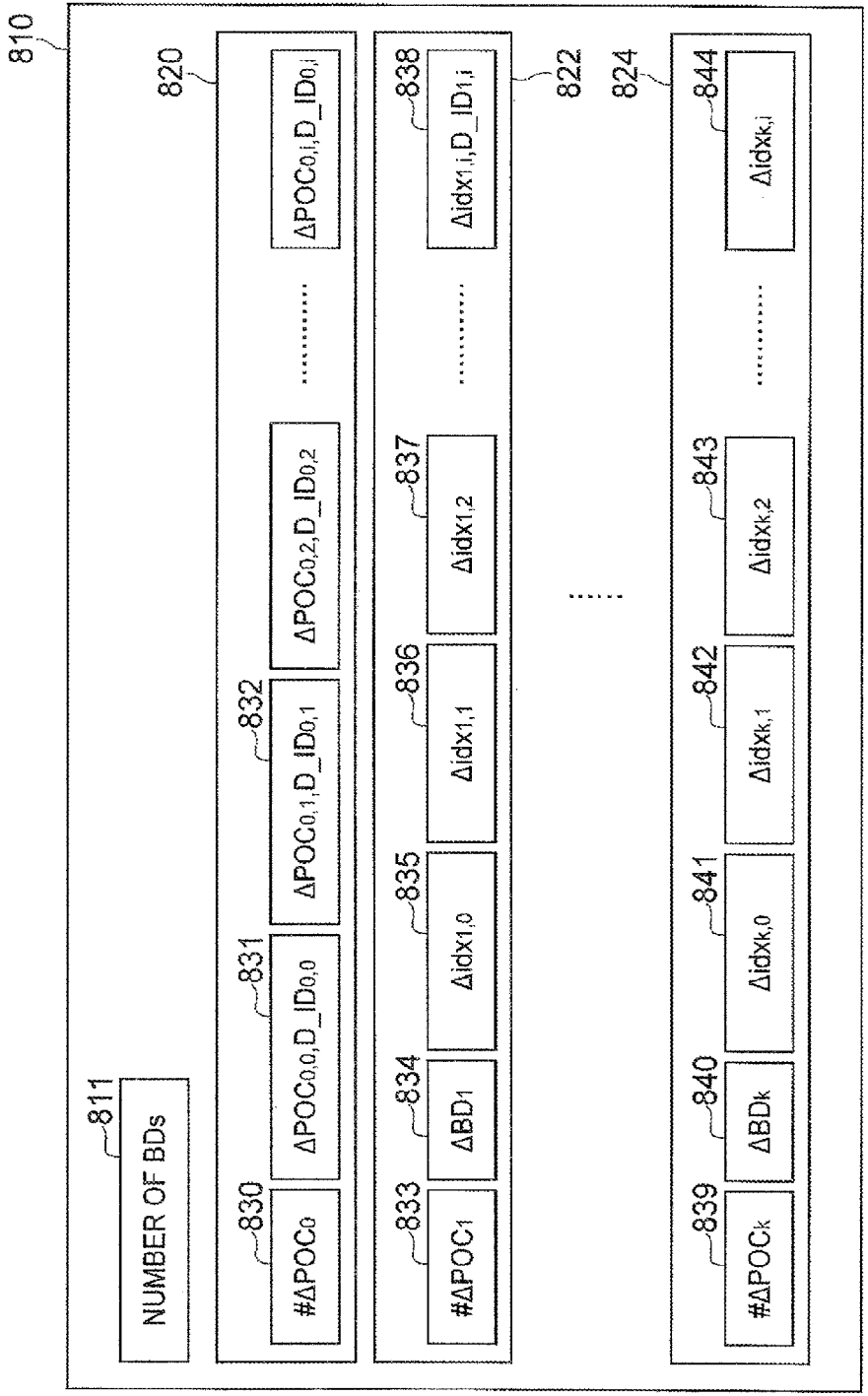
FIG. 8 is a schematic diagram showing an example of the buffer description information described in a PPS generated by an embodiment.

FIG. 3 shows an example method of encoding the buffer description information in the buffer management unit 114 of the video predictive encoding device 100 according to an embodiment, which is a method for encoding pieces of buffer description information together for respective target pictures. In the present specification, a buffer description is represented by BD (buffer description) and BD[k] indicates information about the k-th BD. FIG. 8 shows a schematic diagram of an example of buffer description information described in a PPS generated according to an embodiment.

In FIG. 3 step 310 is to set a counter k to zero. Step 320 is to encode the total number of all BDs described in the PPS information. This number corresponds to 811 in FIG. 8. Step 330 is to encode information about BD[0] which is the first BD. 820 in FIG. 8 indicates the information of BD[0]. #$\Delta POC_0$ (830) indicates the number of components of BD[0], i.e., the number of reference pictures needed. The information of BD[0] herein contains not only the reference pictures needed for encoding and decoding of the target picture, but also reference pictures that are not referenced in the processing for the target picture but are referenced in the encoding and decoding processing for subsequent pictures thereto, and, for this reason, the number of such reference pictures is also counted in #$\Delta POC_0$.

Subsequently, information about the reference pictures to be used (831, 832, . . . ) is described. In the present embodiment $\{\Delta POC_{0,i}, D\_ID_{0,i}\}$ is described as the information about the reference pictures. The index i represents the i-th component of BD[0]. $\Delta POC_{0,i}$ is a difference value between a POC number of the i-th reference picture and a POC number of the target picture that uses BD[0], and $D\_ID_{0,i}$ dependence information of the i-th reference picture.

The information about BD[k] except for BD[0] is predictively encoded with reference to the buffer information BD[m] appearing before it (step 360). The present embodiment employs m=k−1, but reference can be made to any BD[m] as long as m<k. The information contained in BD[k] where k>0 is exemplified by 822 and 824 in FIG. 8. The contents described therein include the number of components of BD[k] (which corresponds to the number of reference pictures needed for the target picture and subsequent pictures) #$\Delta POC_k$ (833, 839), $\Delta BD_k$ (834, 840), and, $\Delta idx_{k,i}$ (835, 836, 837, 841, 842, 843, 844) or $\{\Delta idx_{k,i}, D\_ID_{k,i}\}$ (838). The details of these transmitted data (syntaxes) will be described later. After every BD[k] is encoded, it is sent as part of the PPS information together with other compressed data. In encoding each picture, the buffer management unit 114 prepares the reference pictures in the frame memory 104, based on one piece of buffer description information BD[k] designated via the input terminal 113 in FIG. 1, and then the encoding process is carried out. On the receiver side, the buffer management unit 209 prepares the reference pictures in the frame memory 207, based on the identifier k of the buffer description added to the header of the compressed data of each picture, and then the decoding process is carried out.

Figure 4:
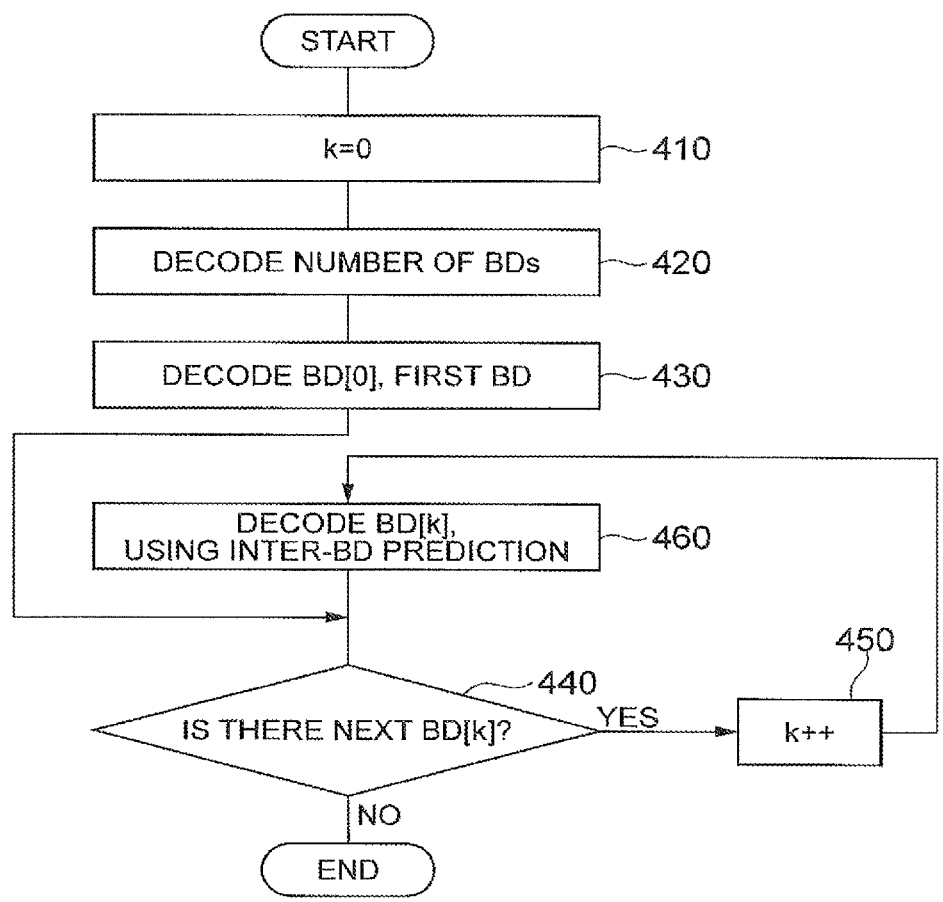
FIG. 4 is a flowchart showing an example of a buffer management method in the video predictive decoding device according to an embodiment.

FIG. 4 is a flowchart showing an example method of decoding the buffer description information in the buffer management unit 209 of the video predictive decoding device 200 according to an embodiment. The data analysis unit 202 extracts the data about the buffer description information from the PPS information and feeds the data to the buffer management unit 209. Step 420 is to first decode the number of BDs. Step 430 is to decode the information about BD[0] which is the first BD. The information about BD[k] where k>0 is predictively decoded with reference to the buffer description BD[m] appearing before it (step 460). As described above, the present embodiment employs m=k−1. The buffer description information resulting from decoding of every BD[k] is stored in the buffer management unit 209. In decoding each picture, the buffer management unit 209 prepares the reference pictures in the frame memory 207, based on one piece of buffer description information BD[k] designated in the compressed data, and then the decoding and reproduction processing is carried out.

The buffer description (BD[k], k>0) shown in FIG. 8 can be sent efficiently. According to the present embodiment, using BD[k] as a target and BD[m] for the prediction of the target satisfies the following conditions.

(a) At least some of the reference pictures described in BD[k] are those already described in BD[m].

(b) N pictures which are newly encoded or decoded in addition to those in (a) (above) are described as "additional reference pictures" in BD[k]. The number N herein is an integer of not less than 0.

Furthermore, more preferred modes satisfy the following conditions.

(c) m=(k−1); that is, the immediately previous BD in the buffer description information is used for the prediction.

(d) The number of additional reference pictures described in above (b) is only one (N=1). This one additional reference picture is preferably a picture generated in the process using BD[m].

The above-described conditions will be described using the example of FIG. 16. Column 1601 in FIG. 16 represents the POC number of each target picture as a target of the encoding or decoding process. The POC numbers of respective target pictures are arranged in order from top, in the order of the encoding or decoding process. For example, after the picture with POC=32 is encoded or decoded, the picture with POC=28 is encoded or decoded. Furthermore, the POC numbers of reference pictures (plural pictures) to be used in execution of the encoding or decoding process of each target picture are described in respective cells under column 1602.

The information about the reference pictures used for encoding or decoding/reproduction of the target picture (1610) with POC=32 is encoded as BD[0] using the syntax of 820 in FIG. 8. In this case, #$\Delta POC_0$=4 and the reference pictures with the POC numbers of 18, 20, 22, and 24 are encoded as $\Delta POC_{0,i}$. The values of $\Delta POC_{0,i}$, are the values in i=0, 1, 2, 3 in row 1710 in FIG. 17, and each value is obtained from a difference between the POC number of the reference picture and the POC number of the target picture.

The information about the reference pictures described in rows 1611 to 1617 in FIG. 16 is encoded as BD[k], k>0, using the syntaxes of 822, 824 in FIG. 8. Row 1611 corresponds to k=1 and indicates information about the POC numbers of the reference pictures to be used for the target picture with POC=28. The POC numbers (22, 24, 32) from this information are converted to difference values $\Delta POC_{1,i}$. The resulting values are given as values in i=0, 1, 2 in row 1711 in FIG. 17. In embodiments, these values of $\Delta POC_{1,i}$ are predictively encoded with reference to $\Delta POC_{0,i}$ (the values in i=0, 1, 2, 3 in row 1710).

The predictive encoding method of buffer description information will be described. Let BD[k] be the buffer description information as a target and BD[m] be the buffer description information for the prediction of BD[k]. Furthermore, let $POC_{current}$ be the POC number of the target picture using the information of BD[k] and $POC_{previous}$ be the POC number of the target picture using the information of BD[m]. In addition, let $POC_{k,i}$ be the POC number of the i-th reference picture of BD[k] and $POC_{m,j}$ be the POC number of the j-th reference picture of BD[m]. In this case the difference values $\Delta POC_{k,i}$ and $\Delta POC_{m,j}$ are given as follows.

$$\Delta POC_{k,i} = POC_{k,i} - POC_{current} \quad (1)$$

$$\Delta POC_{m,j} = POC_{m,j} - POC_{previous} \quad (2)$$

$\Delta POC_{k,i}$ is encoded using $\Delta POC_{m,j}$ as a predictive value. For example, the following relation holds.

$$\begin{aligned}\Delta POC_{k,i} - \Delta POC_{m,j} &= (POC_{k,i} - POC_{current}) - (POC_{m,j} - POC_{previous}) \\ &= (POC_{k,i} - POC_{m,j}) + (POC_{previous} - POC_{current}) \\ &= (POC_{k,i} - POC_{m,j}) + \Delta BD_k\end{aligned} \quad (3)$$

When the aforementioned condition (a) is satisfied, $POC_{m,j}$ is in BD[m] and, therefore, an identifier (or index) to $\Delta POC_{m,j}$ to make $(POC_{k,i}-POC_{m,j})$ zero is encoded. In the present embodiment, the identifier $\Delta idx_{k,i}$ defined below is used.

$$\Delta idx_{k,i} = \text{offset}_{k,i} - \text{offset}_{k,j-1} \quad (4)$$

In this case, $\text{offset}_{k,i}$=j−i and $\text{offset}_{k,-1}$=0. Since $\Delta BD_k$ defined in above formula (3) is constant irrespective of the values of (i, j), it is only necessary to describe $\Delta BD_k$ defined below, once in BD[k].

$$\Delta BD_k = POC_{previous} - POC_{current} \quad (5)$$

On the other hand, there is a situation where $\Delta POC_{m,j}$ to make $(POC_{k,i}-POC_{m,j})$ zero, is absent in BD[m]. For example, the component $POC_{1,2}$=32 (cell 1620) in FIG. 16 is not present as a reference picture in row 1610. In this case, the value of $\Delta POC_{k,i}$ may be encoded as it is, but when the aforementioned condition (d) is applied, $\Delta POC_k = \Delta BD_k$ and this value is already described in BD[k]; therefore, there is no need for encoding it again. The value of the number of components of BD[m] (i.e., #$\Delta POC_m$), or a value larger than the number of components of BD[m], is set as the value of j to indicate that there is no identical POC number in BD[m]. A decoding method of $\Delta POC_{k,j}$ using the value of j in future decoding will be described later.

As for the dependence information $D\_ID_{k,i}$ which each reference picture has, if the reference picture exists in BD[m] used for the prediction, there is no need for encoding thereof because the dependence information $D\_ID_{k,i}$ is equal to $D\_ID_{m,j}$. On the other hand, if the reference picture does not exist in the BD[m] which is used for the prediction, the dependence information $D\_ID_{k,i}$ is encoded.

The contents (syntaxes) of 822, 824 in FIG. 8 are configured based on the above-described conception and the processes of block 360 in FIG. 3, and block 460 in FIG. 4, which will be explained based on this conception.

Figure 6:
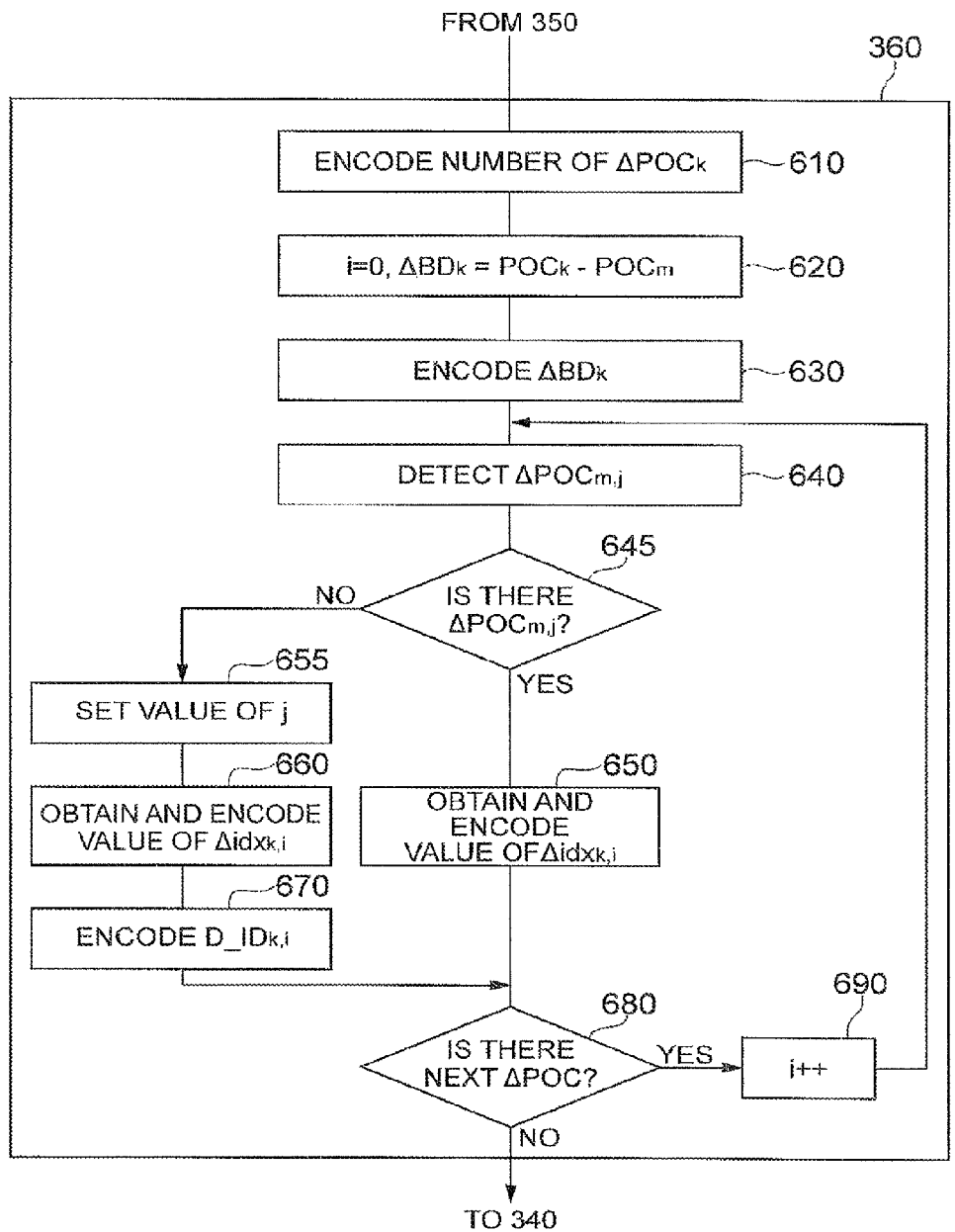
FIG. 6 is a flowchart showing an example encoding process of buffer description information in the video predictive encoding device according to an embodiment.

FIG. 6 is a flowchart showing an example of the encoding process of the buffer description information (the process of block 360 in FIG. 3) in the video predictive encoding device 100 according to an embodiment. This process corresponds to the encoding process of BD[k] in the case of k>0 in FIG. 8. Step 610 is to encode the number of components of BD[k], i.e., to encode the number #$\Delta POC_k$ of reference pictures described. Then $\Delta BD_k$ is calculated (step 620) and then it is encoded (step 630). Thereafter, the following process is carried out for each component of BD[k]. Step 640 is to detect whether there is $\Delta POC_{m,j}$ sharing the same reference picture with $\Delta POC_{k,i}$ (i.e., $POC_{m,j}=POC_{k,i}$) in BD[m] (m=k−1). When it is determined in step 645 that it is present, the processing proceeds to step 650 to determine and then encode the value of $\Delta idx_{k,i}$ according to above formula (4). When it is determined in step 645 that it is absent, the processing proceeds to step 655. Step 655 is to set the value of the number (#$\Delta POC_m$) of components of BD[m] in the value j. The set value may be a value larger than it. Step 660 is to determine the value of $\Delta idx_{k,i}$ according to above formula (4) and then encode it. Step 670 is to encode the dependence information $D\_ID_{k,i}$ of the reference picture. Each of the foregoing values is converted to a binary code and then it is encoded by arithmetic coding, but any other entropy encoding method may be applied. The above-described processing is repeatedly carried out up to the last component of BD[k].

FIG. 5 shows an example of the result obtained by processing the buffer description information in conventional technology such as in the example shown in FIG. 17, by the aforementioned method. Column 501 represents the identifier of each BD[k] and in the present embodiment it is not explicitly encoded. Column 502 represents the number of components of each BD[k] and column 504 data for describing the reference pictures of BD[k]. Row 510 corresponds to BD[0] and is encoded using the values of $\Delta POC_{k,i}$. Row 511 and subsequent rows represent values of $\Delta idx_{k,i}$. Column 505 represents the identifier of each BD[m] used for the prediction, but since m=k−1 in the present embodiment, there is no need for encoding it. Column 506 represents $\Delta BD_k$. Each of entries in cells 520-523 corresponds to a situation where there is no identical reference picture in BD[m] used for the prediction and it is necessary to encode $D\_ID_{k,i}$, in addition to $\Delta idx_{k,i}$; but illustration of the encoding of $D\_ID_{k,i}$ is omitted from FIG. 5. Most of the values in the respective cells under 504 in FIG. 5 are "0" and the values and dynamic range are smaller than those of the information in conventional technology such as the example shown in FIG. 17, thus achieving the effect of efficient encoding. The conventional technology needs to encode $D\_ID_{k,i}$ of all components, whereas the method of the predictive video coding system encodes $D\_ID_{k,i}$ for only limited components, so as to further reduce the bit count.

Figure 7:
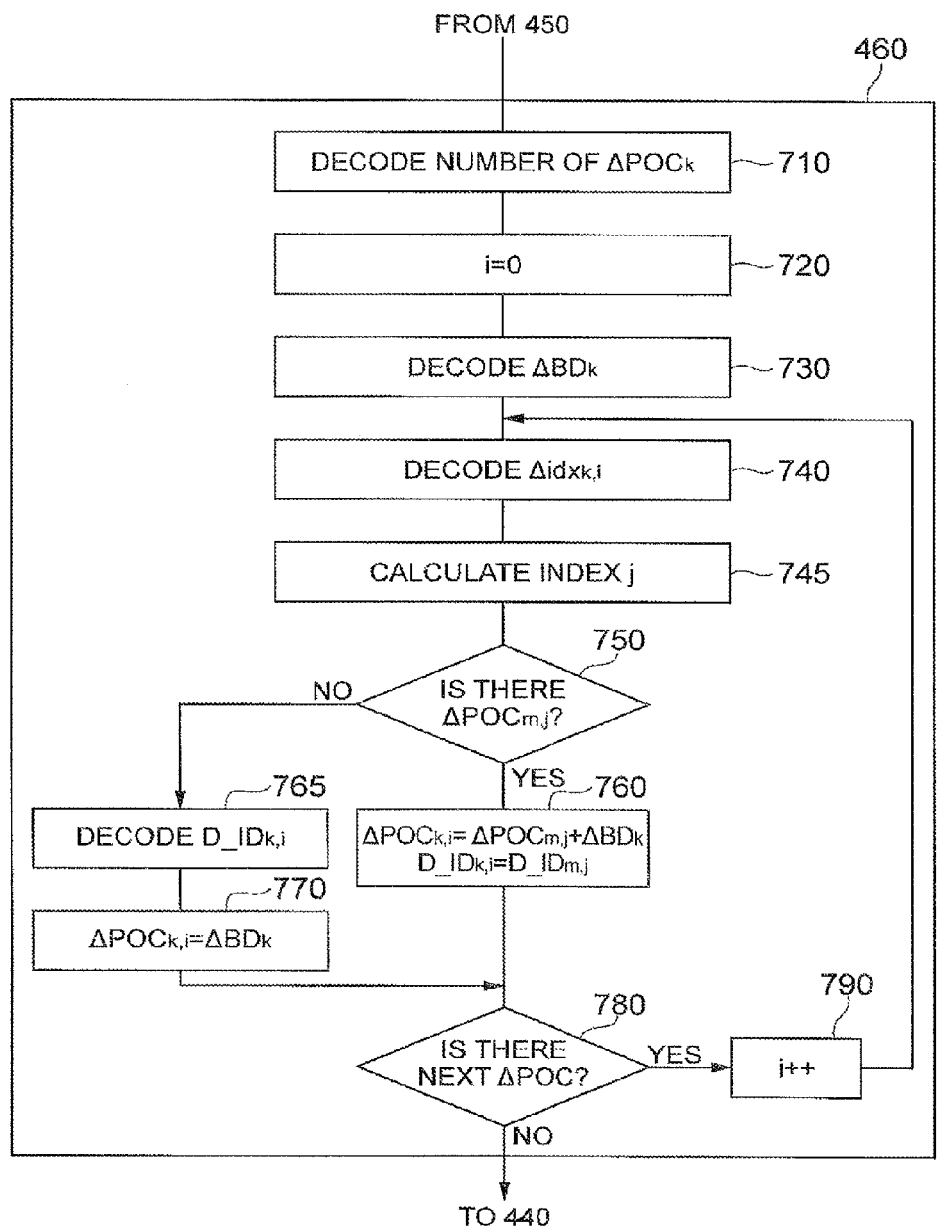
FIG. 7 is a flowchart showing an example decoding process of buffer description information in the video predictive decoding device according to an embodiment.

FIG. 7 is a flowchart showing an example of the decoding process of the buffer description information (the process of block 460 in FIG. 4) in the video predictive decoding device 200 according to an embodiment. This process corresponds to the decoding process of BD[k] in the case of k>0 in FIG. 8. Step 710 is to decode the number of components of BD[k], i.e., to decode the number $\#\Delta POC_k$ of reference pictures described. Step 730 is to decode $\Delta BD_k$. The below-described decoding processing is then carried out for each of the components of BD[k]. Step 740 is to decode $\Delta idx_{k,i}$ and then the value of index j is determined using the following formula (step 745).

$$j=i+\Delta idx_{k,i}+\text{offset}_{k,i-1}, \text{ where offset}_{k,-1}=0 \quad (6)$$

Using this index j, it is determined in step 750 whether $\Delta POC_{m,j}$ as a reference value of $\Delta POC_{k,i}$ of a decoding target is present in BD[m]. If j< the number ($\#\Delta POC_m$) of components of BD[m], $\Delta POC_{m,j}$ is present; if j≥($\#\Delta POC_m$), $\Delta POC_{m,j}$ is absent. When it is determined in step 750 that it is present, the processing proceeds to step 760 to determine the value of $\Delta POC_{k,i}$. The dependence information $D\_ID_{k,i}$ is simply a copy of that of $\Delta POC_{m,j}$. It should be noted herein that there is no need for encoding of the dependence information $D\_ID_{k,i}$. When it is determined in step 750 that it is absent, the processing proceeds to step 765. In this step, the dependence information $D\_ID_{k,i}$ is decoded and $\Delta BD_k$ is substituted for the value of $\Delta POC_{k,i}$ in step 770. The above processing is repeatedly carried out up to the last component of BD[k].

As described above, the encoding and decoding methods of buffer description information make use of the property of repetitive use of reference pictures and make use of the correlation between pieces of buffer description information BD[k] used for different pictures, to compact or eliminate redundant information, thereby achieving the efficient encoding of buffer description information.

As shown in the example of FIG. 16, the information about the buffer is arranged in the sequence of encoding and decoding of target pictures. For this reason, the aforementioned conditions (a) to (d) are met and the above-described embodiment allows the buffer description information to be encoded by the most efficient method. On the other hand, the order of buffer descriptions is arbitrary, and each BD[k] may be described in an order different from that shown in FIG. 16. The below will describe a different embodiment, which may provide additional versatility.

In the example of FIG. 9 the buffer information is described in an order slightly different from that in FIG. 16. The difference from FIG. 16 is that the buffer information about POC=25 (913) is described prior to POC=30 (914). However, the reference pictures used are the same as in the case of FIG. 16. In this example, the target picture with POC=25 (913) uses the reference pictures with POC=22, 24, 32, 28, 26, and 30, and the target picture with POC=26 (912) located immediately above it uses the reference pictures with POC=22, 24, 32, and 28. If the buffer description information BD[m] in row 912 is used for the prediction of the buffer description information BD[k] in row 913, the component with POC=30 (963) belonging to BD[k] is absent in BD[m] and thus is not generated by use of BD[m].

For example, when the aforementioned condition (c) (m=k−1) is used, the aforementioned condition (d) is not satisfied.

In order to solve this problem, the aforementioned condition (c) is relieved so as to allow free selection of BD[m] and, in turn, an index m to identify BD[m] used for the prediction is encoded. In that case, when the buffer description information in row 914 is used as BD[m] for the prediction of the buffer description information BD[k] in row 913, FIG. 6 and FIG. 7 can be applied as they are (provided that encoding and decoding of the index m are added).

As another method, it is also possible to adopt a method of encoding the POC number $\Delta POC_{k,i}$ in aforementioned formula (1) as it is, for an additional reference picture absent in BD[m] used for the prediction, or, to adopt a method of encoding a difference between $\Delta POC_{k,i}$ and $\Delta BD_k$ as $IBDR_{k,i}$.

$$IBDR_{k,i}=\Delta POC_{k,i}-\Delta BD_k \quad (7)$$

Figure 12:
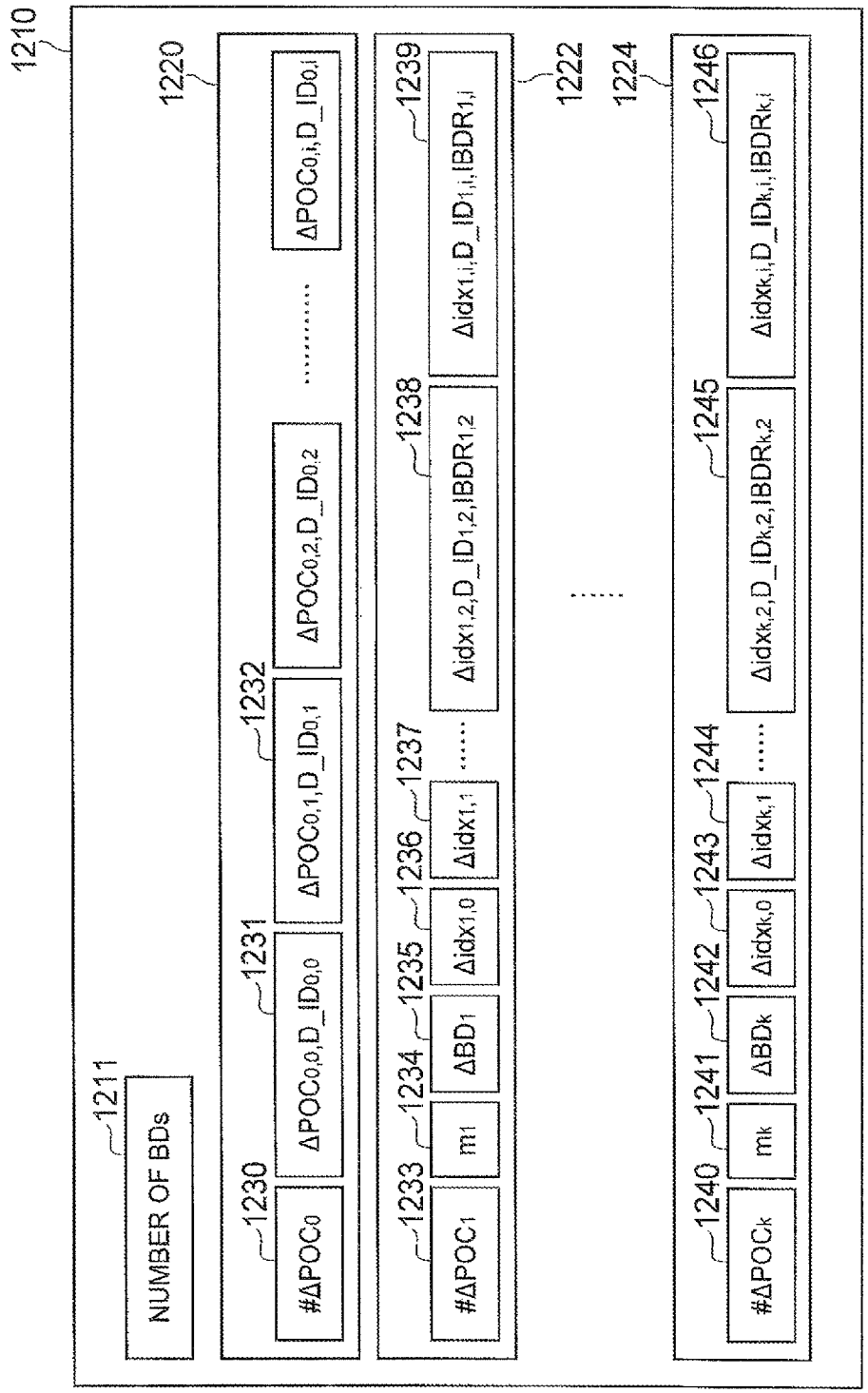
FIG. 12 is a schematic diagram showing an example of the buffer description information described in a PPS generated by an embodiment related to the example of FIG. 9.

When the above formula (7) is expanded, it is equal to $(POC_{k,i}-POC_{previous})$. FIG. 12 shows a schematic diagram of an example of buffer description information described in a PPS created by the aforementioned embodiment which may provide more versatility. In FIG. 12 numeral 1211 is same as 811 in FIG. 8 and numeral 1220 the same as 820. BD[k] in the case of k>1 is transmitted in the syntax represented by 1222 or 1224. The syntax in this case is composed of the number of components of BD[k] (which is the number of reference pictures necessary for the target picture and subsequent pictures) $\#\Delta POC_k$ (1233, 1240), the identifier $m_k$ (1234, 1241) of the buffer description information used for the prediction, $\Delta BD_k$ (1235, 1242), and, $\Delta idx_{k,i}$ (1236, 1237, 1243, 1244) or $\{\Delta idx_{k,i}, D\_ID_{k,i}, IBDR_{k,i}\}$ (1238, 1239, 1245, 1246).

Figure 10:
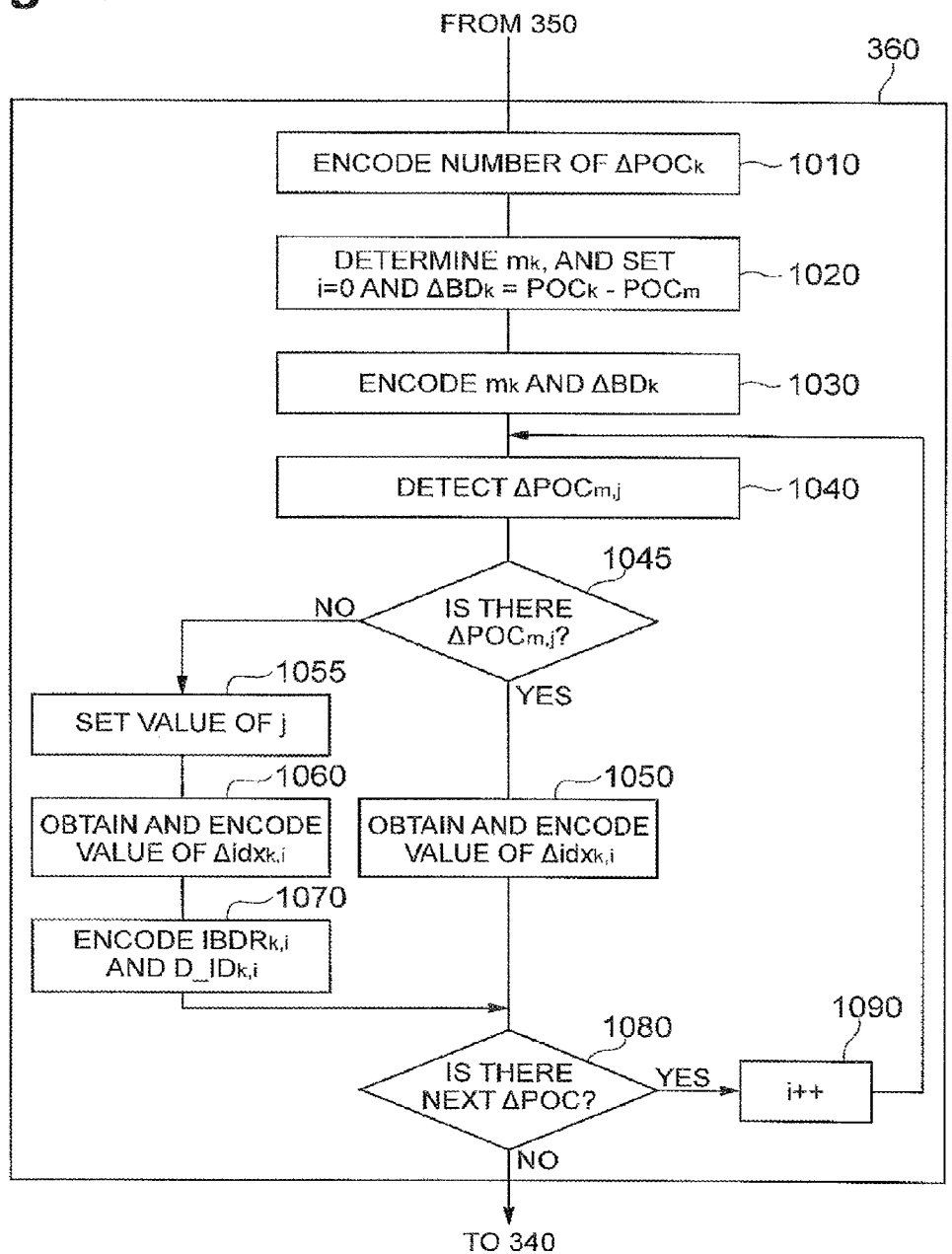
FIG. 10 is a flowchart showing an example encoding process of buffer description information in the video predictive encoding device according to an embodiment related to the example of FIG. 9.

The buffer description information shown in FIG. 12 is encoded and decoded as follows. FIG. 10 is a flowchart showing an example of the more versatile encoding process of buffer description information (the process of block 360 in FIG. 3) in the video predictive encoding device 100 according to an embodiment. This process corresponds to the encoding process of BD[k] in the case of k>0 in FIG. 12. Step 1010 is to encode the number of components of BD[k], i.e., to encode the number $\#\Delta POC_k$ of reference pictures described. The next step is to determine the buffer description information BD[m] for reference used in the prediction, to specify the identifier $m_k$ thereof, and, at substantially the same time, to calculate $\Delta BD_k$ (step 1020). Step 1030 is to encode $m_k$ and $\Delta BD_k$. Then the following processing is carried out for each of the components of BD[k]. Step 1040 is to detect whether $\Delta POC_{m,j}$ is sharing the same reference picture with $\Delta POC_{k,i}$ (i.e., $POC_{m,j}=POC_{k,i}$) is present in BD[$m_k$]. When it is determined in step 1045 that it is present, the processing proceeds to step 1050 to determine the value of $\Delta idx_{k,i}$ according to the aforementioned formula (4) and then encode it. When it is determined in step 1045 that it is absent, the processing proceeds to step 1055. Step 1055 is to set a value not less than the value of the number ($\#\Delta POC_m$) of components of BD[m], in the index j. In this case, a value not yet used for the setting is set as the value of the index j, in order to adapt for a possibility of presence of one or more additional reference pictures (absent in BD[m]). Step 1060 is to determine the value of $\Delta idx_{k,i}$ according to the aforementioned formula (4) and then encode it. Step 1070 is to determine the value of $IBDR_{k,i}$ according to the aforementioned formula (7) and then encode it together with the dependence information $D\_ID_{k,i}$ of the reference picture. Each of the foregoing values is converted to a binary code and encoded by arithmetic coding, but any other entropy encoding method may be applied. The above processing is repeatedly carried out up to the last component of BD[k].

FIG. 21 shows an example result of the processing obtained by converting the buffer description information in the example of FIG. 9 into $\Delta POC_{k,i}$ shown in FIG. 20 and then processing it by the above-described more versatile method. Column 941 represents the identifier of each BD[k]. Column 942 represents the number of components of each BD[k] and column 944 the data for description of the reference pictures of BD[k]. Row 950 corresponds to BD[0] and is encoded by the values of $\Delta POC_{k,i}$. Row 951 and subsequent rows are encoded by $\Delta idx_{k,i}$ or $\{\Delta idx_{k,i}, IBDR_{k,i}\}$ ($D\_ID_{k,i}$ is omitted in FIG. 21). Column 945 represents the identifier $m_k$ of BD[m] used for the prediction. Column 946 represents $\Delta BD_k$. Each of entries in cells 980-983 corresponds to a situation where there is no identical reference picture in BD[m] used in the prediction and where $\{\Delta idx_{k,i}, D\_ID_{k,i}, IBDR_{k,i}\}$ is encoded. Most of the values in the respective cells under 944 in FIG. 21 are "0" and the values and dynamic range are smaller than those of the information in conventional technology, such as in the example of FIG. 20, thus achieving the effect of efficient encoding.

Figure 11:
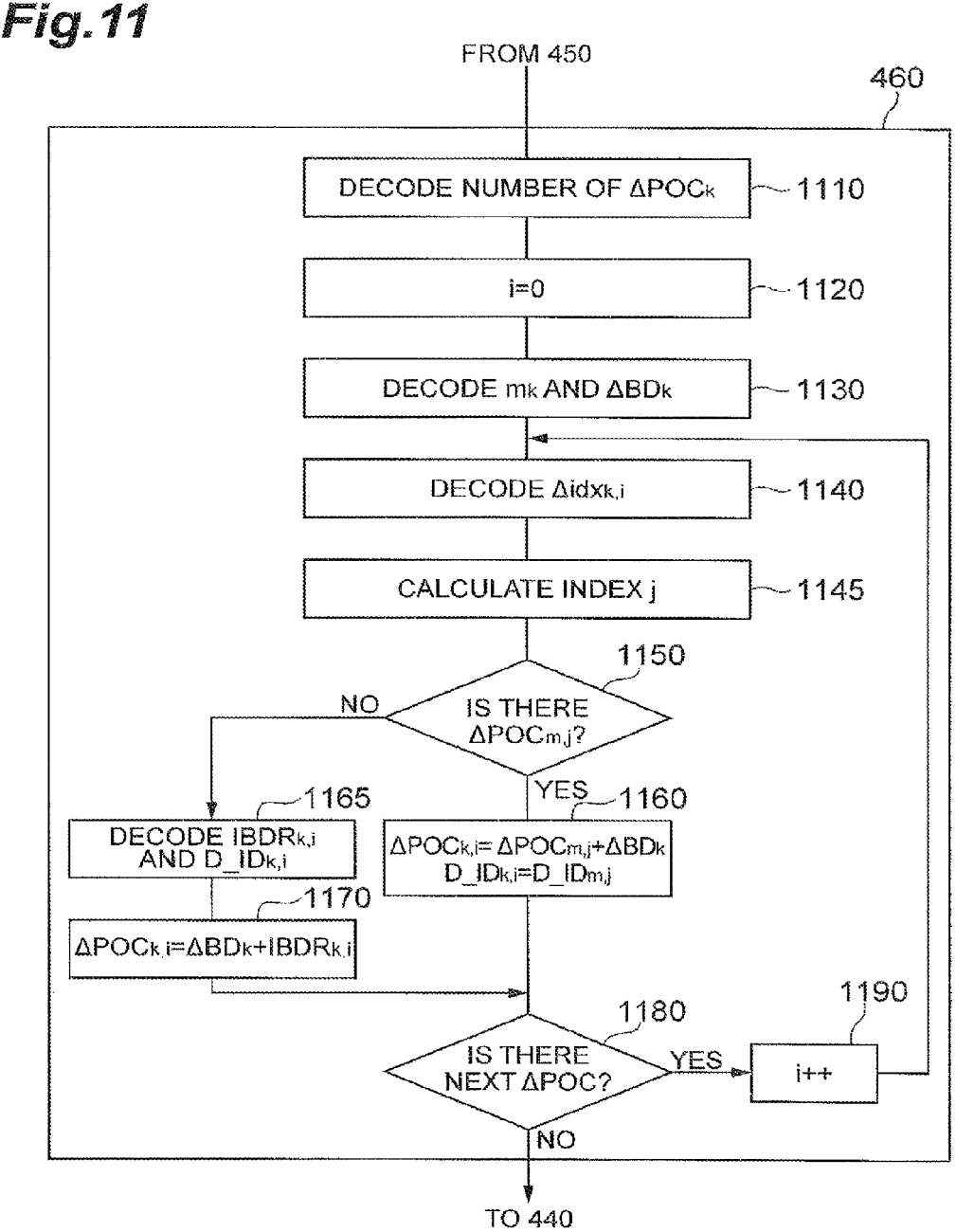
FIG. 11 is a flowchart showing an example decoding process of buffer description information in the video predictive decoding device according to an embodiment related to the example of FIG. 9.

FIG. 11 is a flowchart showing an example of the more versatile decoding process of buffer description information (the process of block 460 in FIG. 4) in the video predictive decoding device 200 according to an embodiment. This process corresponds to the decoding process of BD[k] in the case of k>0 in FIG. 12. Step 1110 is to decode the number of components of BD[k], i.e., to decode the number $\#\Delta POC_k$ of reference pictures described. Step 1130 is to decode $m_k$ and $\Delta BD_k$. Then the following decoding processing is carried out for each of the components of BD[k]. Step 1140 is to decode $\Delta idx_{k,i}$ and then the value of index j is determined using the aforementioned formula (6) (step 1145).

Using this index j, it is determined in step 1150 whether $\Delta POC_{m,j}$ as a reference value of $\Delta POC_{k,i}$ of a decoding target is present in BD[m]. In this example, if j< the number ($\#\Delta POC_m$) of components of BD[m], $\Delta POC_{m,j}$ is present; if j≥($\#\Delta POC_m$), $\Delta POC_{m,j}$ is absent. When it is determined in step 1150 that it is present, the processing proceeds to step 1160 to determine the value of $\Delta POC_{k,i}$. The dependence information $D\_ID_{k,i}$ can be simply a copy of that owned by $\Delta POC_{m,j}$. When it is determined in step 1150 that it is absent, the processing proceeds to step 1165. In this step, $IBDR_{k,i}$ and the dependence information $D\_ID_{k,i}$ are decoded and the value of $\Delta POC_{k,i}$ is calculated in step 1170. The foregoing processing is repeatedly carried out up to the last component of BD [k].

As described above, the encoding and decoding methods of buffer description information according to the predictive video coding system make use of the property of repetitive use of reference pictures and make use of the correlation between pieces of buffer description information BD[k] used for different pictures, so as to compact redundant information, thereby enabling the efficient encoding of buffer description information. In addition, there is the effect of efficient encoding even in the case where cross reference to buffer description information is freely made.

The example encoding processes of FIG. 6 and FIG. 10 or the example decoding processes of FIG. 7 and FIG. 11 were described separately, but these two embodiments may be used in combination. In the decoding processes, the steps 765, 770 in FIG. 7 are different from the steps 1165, 1170 in FIG. 11, but when they are used in combination, it is only necessary to add information (1 bit) for identification of these processes and encode it.

Since the values of $\Delta idx_{k,i}$ all are zero as seen in rows 512, 513, 514, and 517 in FIG. 5, those values can be represented by one signal (flag), instead of individually encoding them.

Figure 18:
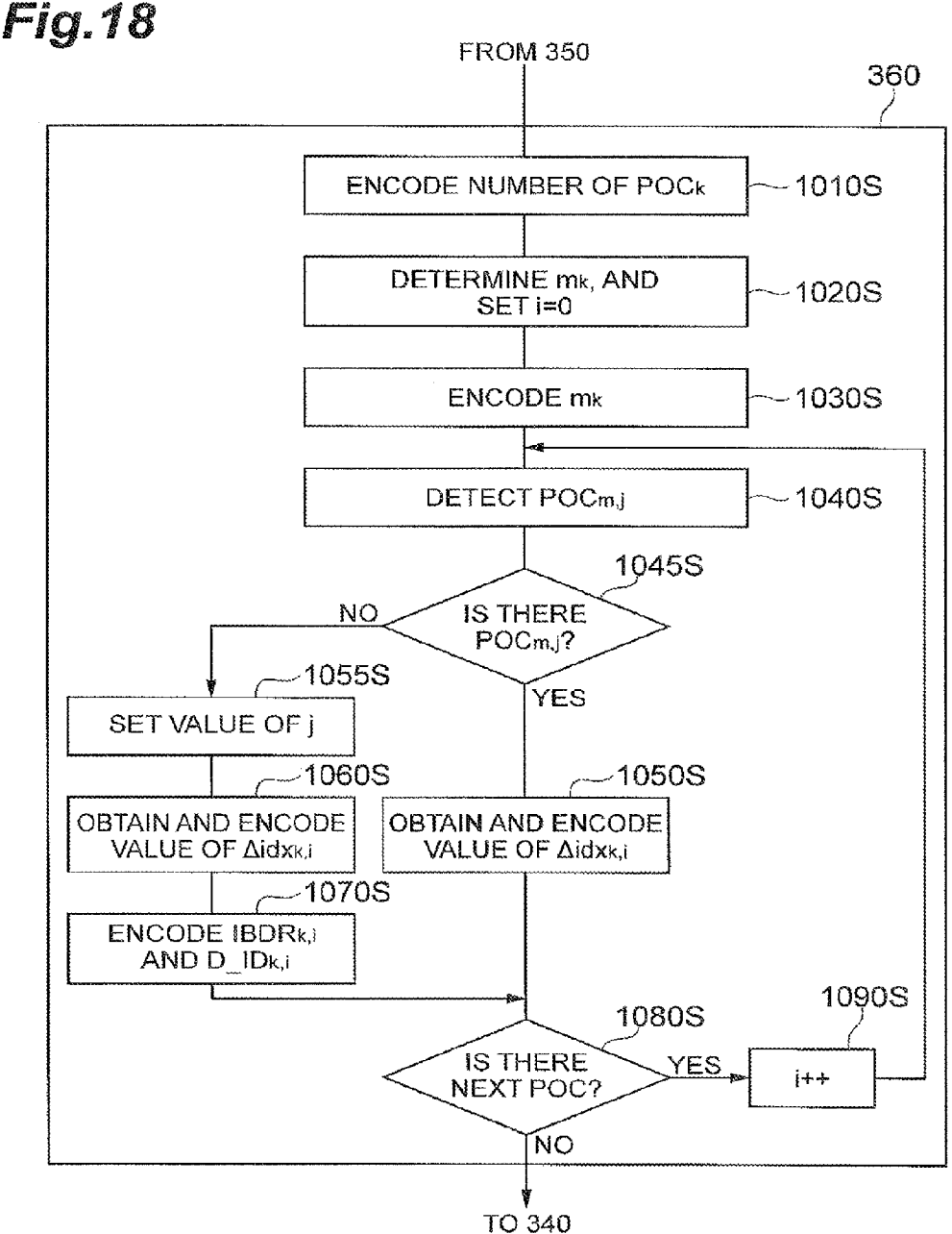
FIG. 18 is a flowchart showing an example process of directly encoding POC numbers of the buffer description information in the video predictive encoding device according to an embodiment.
Figure 19:
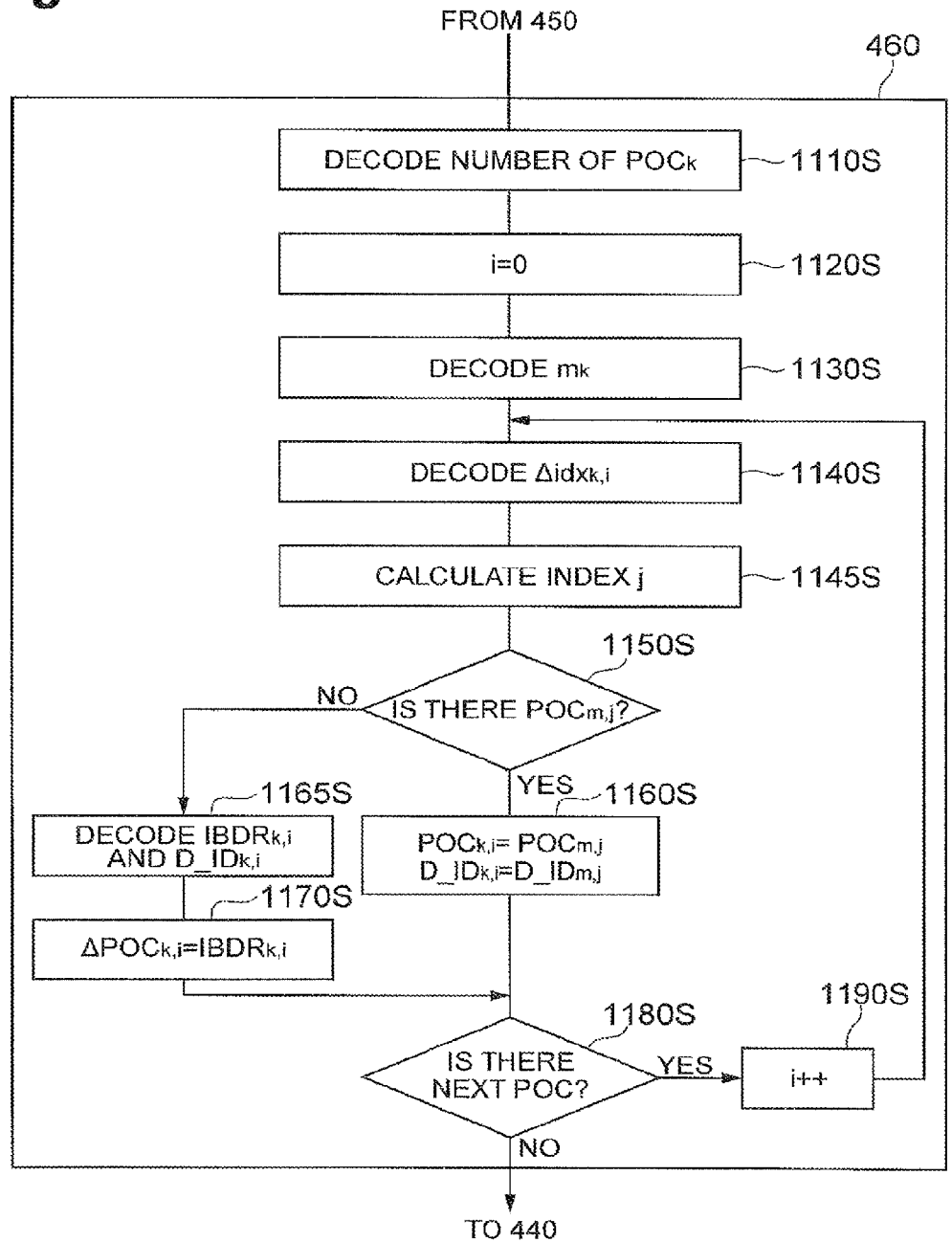
FIG. 19 is a flowchart showing an example process of directly decoding POC numbers of the buffer description information in the video predictive decoding device according to an embodiment.

In the above embodiments, the POC number of each reference picture described in the buffer description information is converted into $\Delta POC_{k,i}$ and then the buffer description information is encoded and decoded, but the method may be applied to the POC number itself. For example, when the POC number in the buffer description information BD[k] as a target is present in BD[m] used for the prediction, $\Delta idx_{k,i}$ indicating the POC number is encoded. When the desired POC number is absent in BD[m], $\Delta POC_{k,i}$ obtained by the aforementioned formula (1) is encoded as $IBDR_{k,i}$. Formula (7) may be used instead of the aforementioned formula (1). In this case the process of block 360 in FIG. 3 is as shown in FIG. 18 and the process of block 460 in FIG. 4 is as shown in FIG. 19. FIG. 18 is much the same as the processing of FIG. 10, and FIG. 19 much the same as the processing of FIG. 11; FIG. 18 and FIG. 19 employ step numbers with "S" attached to the step numbers of the corresponding process steps in FIG. 10 and FIG. 11. It is, however, noted that the processing is carried out for POC instead of $\Delta POC$. In this case $\Delta BD_k$ is zero and thus it does not have to be encoded and decoded. Then, if m=(k−1) is fixed (i.e., in the case of the prediction from immediately previous BD[m]), $m_k$ does not have to be encoded or decoded, either.

In the above embodiments, when $bd_{k,i}$ represents the i-th component of the buffer description BD[k] as a target and $bd_{m,j}$ a component of BD[m] used for the prediction, $\Delta idx_{k,i}$ can be considered to be a relative position (index or address) of $bd_{m,j}$ from $bd_{k,i}$. For example, supposing that $bd_{k,i}$ and $bd_{m,j}$ are information storage places, their POC numbers may be stored in the information storage places or values of $\Delta POC$ may be stored therein. In this case, $\Delta idx_{k,i}$ is treated as a relative position between the information storage places (provided that their contents include the POC numbers used in common). In other words, the buffer description is a description of the positional relationship between the information storage place for storage of the buffer information of the target picture and the information storage place for storage of the buffer information as a reference for the target picture and provides a switching method for reproduction methods of the contents of $bd_{k,i}$ by comparing the position (j) of the designated information storage place with the number ($\#\Delta POC_m$ or $\#POC_m$) of information storage places containing their contents.

Another embodiment as described below is also applicable to the encoding and decoding methods of buffer description information of the predictive video coding system. The present embodiment is based on the aforementioned conditions (c) and (d), similar to the embodiment shown in FIG. 6 and FIG. 7. For example, the buffer description information BD[m] is used for the prediction of the buffer description information BD[k] as a target, and the BD immediately previous to BD[k] is used as BD[m]. That is, m=(k−1). There is only one additional reference picture in BD[k] and this additional reference picture is generated in the case of BD[m] being used.

Under these conditions, the present embodiment is one wherein it is determined in encoding the information of the buffer description BD[k] as a target, whether $\Delta POC_{m,j}$ in BD[m], which is used for the prediction shares an identical reference picture with $\Delta POC_{k,i}$ which is a component of BD[k] (i.e., $POC_{m,j}=POC_{k,i}$) is "present or not". Therefore, the aforementioned embodiment employed the "relative position $\Delta idx_{k,i}$," whereas the present embodiment employs a flag simply indicative of "present or not." This flag is described as ibd_flag$_{k,j}$ herein. When the flag ibd_flag$_{k,j}$ indicates "present," the j-th picture already stored in the buffer is continuously used as a reference picture. On the other hand, when the flag ibd_flag$_{k,j}$ indicates "not," another designated picture is stored as a new reference picture (additional reference picture) into the buffer.

Under the conditions (c) and (d), the number of BD[k] is at most one larger than the number of BD[m]; i.e., the relation of #ΔPOC$_k$=#ΔPOC$_m$+1 is always met, and therefore there is no need for transmission of #ΔPOC$_k$. For this reason, the present embodiment can further reduce the bit count.

Figure 22:
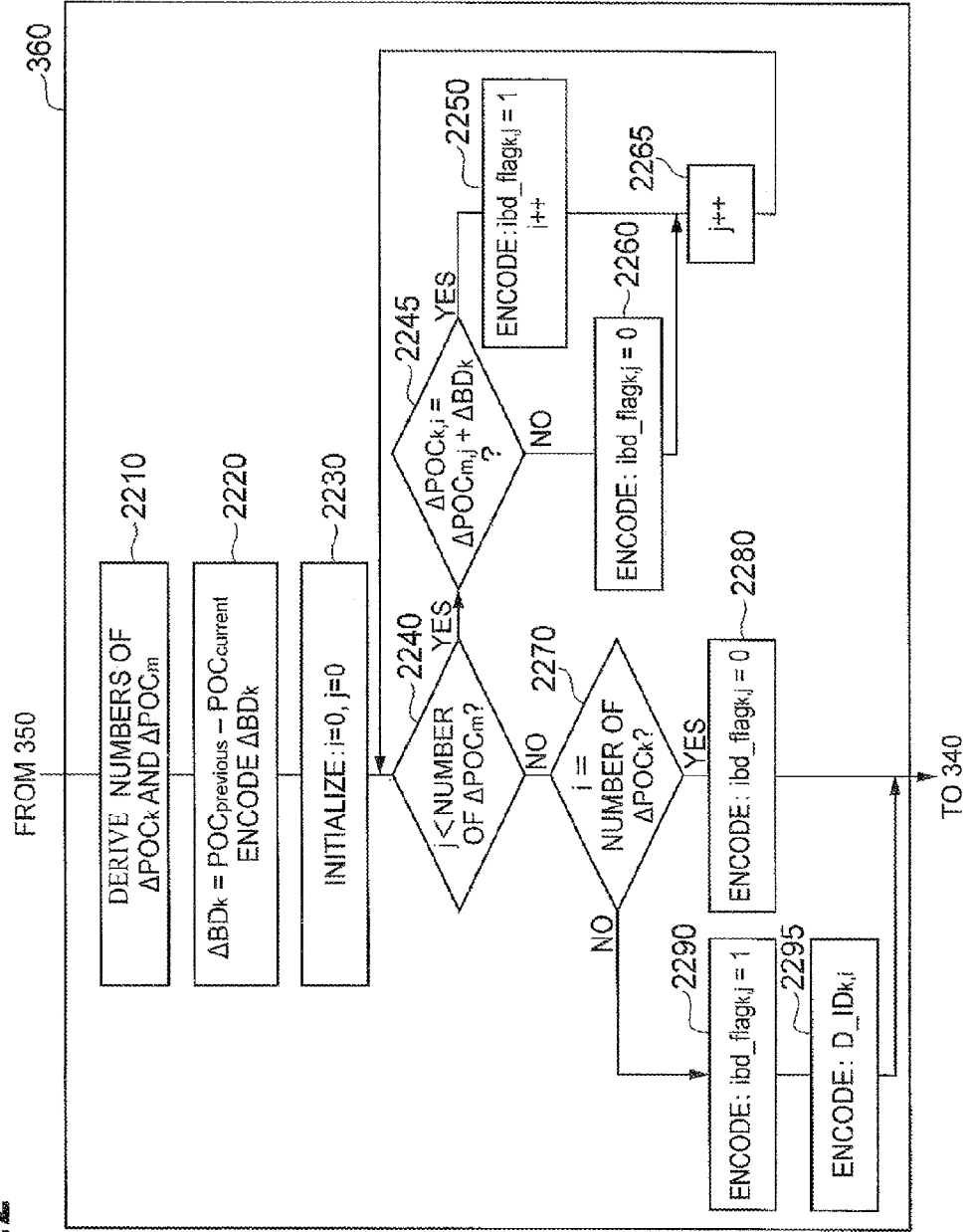
FIG. 22 is a flowchart showing another example implementation method different from the process of FIG. 6 about the encoding process of buffer description information in the video predictive encoding device according to an embodiment.

FIG. 22 shows an example of the encoding process of buffer description information according to the present embodiment based on the above concept. This process applies to the process of step 360 in FIG. 3. Step 2210 is to derive information about the number of ΔPOC$_k$ and the number of ΔPOC$_m$, which are used for a subsequent determination. Step 2220 is to obtain ΔBD$_k$ given by formula (5) and encode ΔBD$_k$. For example, ΔBD$_k$ is obtained as a difference between the POC number POC$_{current}$ of the target picture using the information of BD[k] and the POC number POC$_{previous}$ of the picture using the information of BD[m] used for the prediction of BD[k]. Step 2230 is to initialize the counter i of BD[k] and the counter j of BD[m] to zero.

Next, steps 2240 to 2265 are to check the components of BD[m] as many as the number of ΔPOC$_m$. Specifically, when the condition of step 2245 is satisfied, the processing proceeds to step 2250; otherwise, the processing proceeds to step 2260. Specifically, the condition of step 2245 is given by formula (3) and corresponds to the case of (POC$_{k,i}$=POC$_{m,j}$). Step 2250 is to encode ibd_flag$_{k,j}$ of 1 for indicating that the condition is met, or "present." At substantially the same time, the counter i of BD[k] is given an increment. On the other hand, step 2260 is to encode ibd_flag$_{k,j}$ of 0 for indicating that the condition is "not" met. Step 2265 is to give the count j an increment, for checking the next BD[m].

When the condition of step 2240 is not satisfied, i.e., when the check is completed for all the components of BD[m], the processing proceeds to step 2270. This step is to compare the number of ΔPOC$_k$ with the counter i of buffer description information BD[k] as a target. Since the counter i of BD[k] starts counting from 0, its maximum is (the number of ΔPOC$_k$−1). If the condition of (i=the number of ΔPOC$_k$) is satisfied in step 2270, the counter i exceeds the number of components of BD[k] and ibd_flag$_{k,j}$ is set to 0 to be encoded, followed by end of processing. On the other hand, if the condition of (i=the number of ΔPOC$_k$) is not satisfied in step 2270, it is meant thereby that an additional reference picture absent in BD[m] is stored into the buffer. For encoding information about it, step 2290 is to encode ibd_flag$_{k,j}$ of 1 and step 2295 is to encode the dependence information D_ID$_{k,i}$ of the additional reference picture. Since the value of ΔPOC$_{k,i}$ of the additional reference picture is ΔBD$_k$ as described with FIG. 6, it does not have to be encoded.

Figure 24:
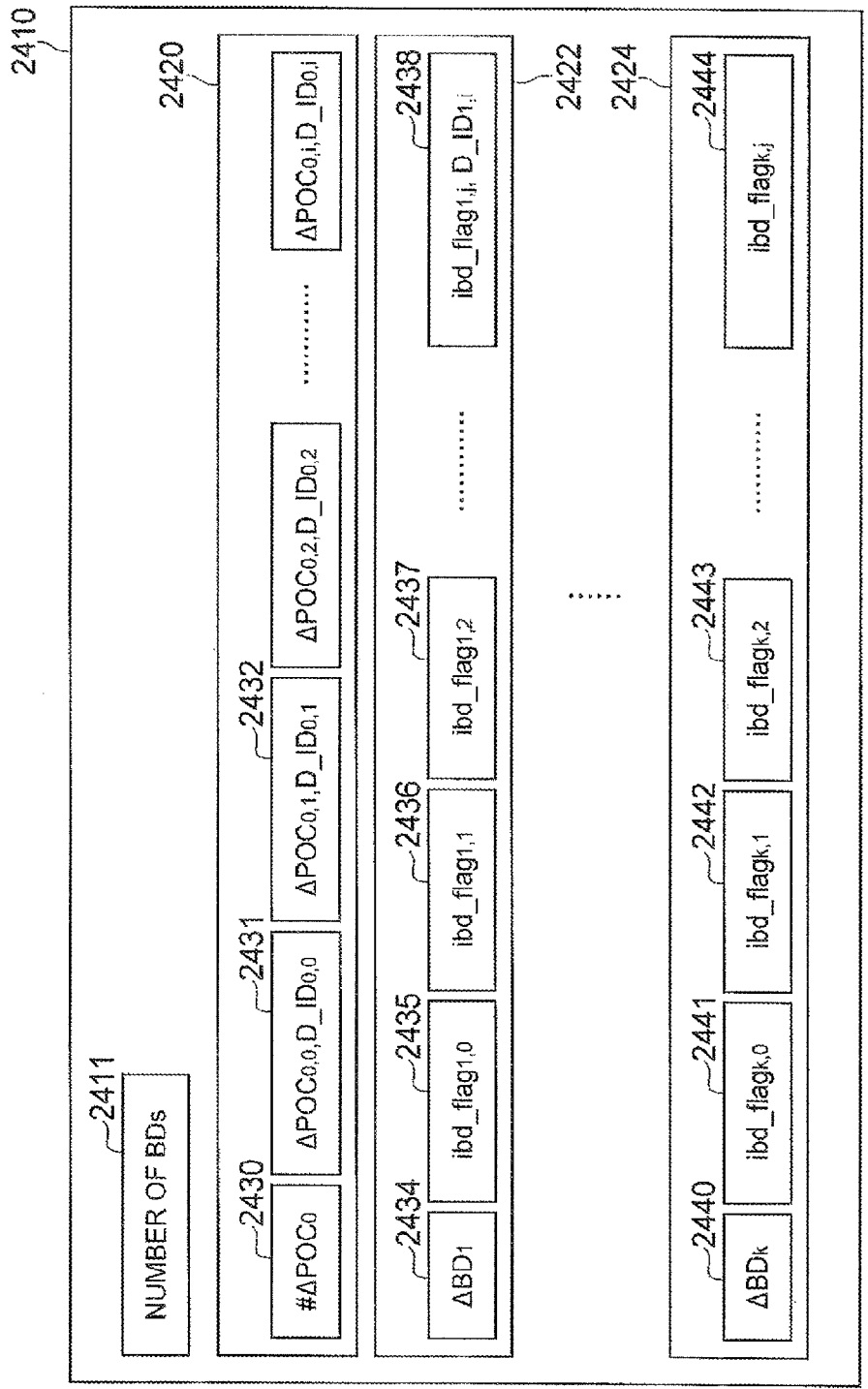
FIG. 24 is a schematic diagram showing an example of the buffer description information described in a PPS generated by the encoding process of buffer description information by an embodiment based on FIG. 22.

FIG. 24 shows an example of a data arrangement of buffer description information described in a PPS generated as described above. FIG. 24 is similar to FIG. 8. "The number of BDs" indicated by 2411 is the same as 811 in FIG. 8, the information 2420 about BD[0] being the first BD is the same as 820 in FIG. 8, and they are generated in step 320 and step 330, respectively, in FIG. 3.

The information contained in BD[k] in the case of k>0 is exemplified by 2422 and 2424 in FIG. 24. The contents described therein are ΔBD$_k$ (2434, 2440) and, ibd_flag$_{k,j}$ (2435, 2436, 2437, 2441, 2442, 2443, 2444) or {ibd_flag$_{k,j}$, D_ID$_{k,i}$} (2438). This data structure (syntax) is similar to FIG. 8 and it is noted that #ΔPOC$_k$ (833, 839) representing the number of BD[k] in the case of k>0 is not needed. ibd_flag$_{k,j}$ takes a value of 1 or 0. Since the information about the number of BD[k] does not have to be encoded, there is an effect of permitting the buffer description information to be expressed by a smaller bit count.

Figure 23:
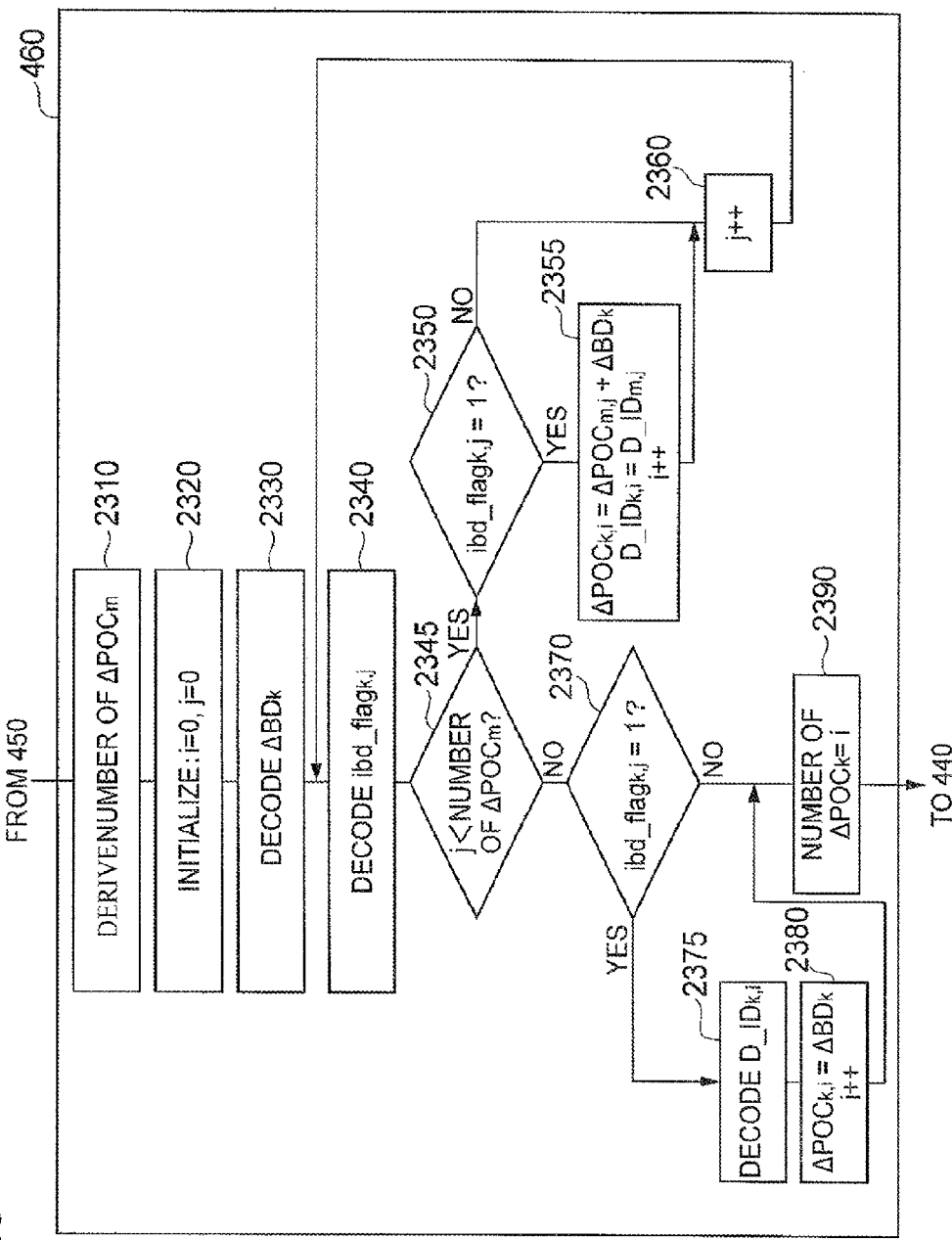
FIG. 23 is a flowchart showing another example implementation method different from the process of FIG. 7 about the decoding process of buffer description information in the video predictive decoding device according to an embodiment.

FIG. 23 shows an example of another implementation method of the decoding process of buffer description information according to the present embodiment. Step 2310 is to derive the number (#ΔPOC$_m$) of ΔPOC$_m$ being the components of BD[m] used for the prediction. The number (#ΔPOC$_m$) of ΔPOC$_m$ is obtained by counting the number of components while reconstructing BD[m]. Step 2320 is to initialize the counter i of BD[k] and the counter j of BD[m] to zero. Step 2330 is to decode the value of ΔBD$_k$ described in the buffer information. Subsequently, ibd_flag$_{k,j}$ is decoded as many times as the number (#ΔPOC$_m$+1) (under control by step 2345). The processes of step 2345 and subsequent steps are carried out based on the decoded values of ibd_flag$_{k,j}$.

Step 2345 is to judge the counter j of BD[m]. Before the counter j reaches the number of ΔPOC$_m$, whether ΔPOC$_{k,i}$ is to be reconstructed using ΔPOC$_{m,j}$ is determined, based on the value of ibd_flag$_{k,j}$ (1 or 0) (step 2350). When the value of ibd_flag$_{k,j}$ is 1, step 2355 is carried out to add ΔBD$_k$ to ΔPOC$_{m,j}$ to generate ΔPOC$_{k,i}$. In this case, ΔPOC$_{k,i}$ and ΔPOC$_{m,j}$ share the same reference picture (POC$_{m,j}$=POC$_{k,i}$), and therefore the dependence information D_ID$_{k,i}$ can be simply a copy of the dependence information D_ID$_{m,j}$ related to ΔPOC$_{m,j}$. Next, the counter i of BD[k] is given an increment and then a determination on the next component of BD[m] is made.

After the check is completed up to the last component of BD[m] (or when step 2345 results in NO), the value of last ibd_flag$_{k,j}$ is judged (step 2370). When ibd_flag$_{k,j}$=0, it is meant thereby that there is no additional reference picture, and the flow goes to below-described step 2390, without any processing. On the other hand, in the case of ibd_flag$_{k,j}$=1, it is meant thereby that there is an additional reference picture (which is absent in BD[m]), and then step 2375 is carried out to reconstruct the dependence information D_ID$_{k,i}$. Step 2380 uses ΔBD$_k$ as the POC number of the additional reference picture (because the condition (d) is applied). Furthermore, the counter i of BD[k] is given an increment. Finally, the value counted by the counter i is stored as the number of BD[k] (step 2390). This number of BD[k] is used for generation of each component of BD[k+1] (in step 2310).

The example processing methods of FIG. 22 and FIG. 23 are the implementation methods where there is only one additional reference picture in BD[k], and in the case where there are N additional reference pictures, the value of N can be transmitted and received as part of the information of BD[k]. In this case, the POC numbers of the additional reference pictures are encoded and decoded using IBDR$_{k,i}$. Specifically, step 2295 in FIG. 22 can be configured to perform the same process as step 1070 in FIG. 10, step 2375 in FIG. 23 can be configured to perform the same process as step 1165 in FIG. 11, and step 2380 in FIG. 23 can be configured to perform the same process as step 1170 in FIG. 11.

In the above example the values of ibd_flag$_{k,j}$ are expressed by one bit (1 or 0), but they may be expressed by two or more bits. In this case, the additional bit or bits may be used to determine whether the other information ($D\_ID_{k,i}$, $IBDR_{k,i}$, or other information) is explicitly encoded.

Furthermore, the additional bit may be used to indicate an application range of the reference pictures associated with $\Delta POC_{k,i}$ (i.e., the reference pictures having the POC numbers of $POC_{k,i}$ given in formula (1)). Specifically, when $ibd\_flag_{k,j}$ is "1," $\Delta POC_{k,i}$ is reconstructed using $\Delta POC_{m,j}$ and, at substantially the same time, the reference picture associated with $\Delta POC_{k,i}$ is applied to the picture as a current processing target (current picture) and a future picture subsequent thereto (a future picture or future pictures). When $ibd\_flag_{k,j}$ is "01," $\Delta POC_{k,i}$ is reconstructed using $\Delta POC_{m,j}$ and, at substantially the same time, the reference picture associated with $\Delta POC_{k,i}$ is not applied to the picture as a current processing target (current picture) but is applied to only a future picture subsequent thereto (a future picture or future pictures). Furthermore, when $ibd\_flag_{k,j}$ is "00," $\Delta POC_{m,j}$ is not used for reconstruction of $\Delta POC_{k,i}$.

In the above embodiments the processing is carried out for $\Delta POC_{k,i}$ described in the buffer description information, but the processing may be carried out for the POC number itself owned by each reference picture.

The buffer description information was described in all the above embodiments. Since the buffer description information is also descriptions about a plurality of reference pictures used for encoding and decoding of the target picture, the foregoing embodiments may also be used as methods for management of reference picture lists.

The above embodiments explained the cases where the buffer description information was encoded together as part of the PPS information, but they are also applicable to cases where the buffer description information is described in the header of each individual target picture. For example, they are also applicable to a configuration wherein the information of row 510 in FIG. 5 is described in the lead (header) of compressed data of the picture with POC=32 and the information of row 511 is described in the lead (header) of compressed data of the picture with POC=28. In this case, the buffer description information BD[k] belonging to the target picture k can be encoded and decoded by the example processes of FIGS. 6, 7, 10, 11, 18, and 19, with reference to the buffer description information BD[m] belonging to the picture m processed previously. However, there are cases where the target picture m is not used as a reference picture at all (where the value of dependence information DID is large), depending upon the prediction structure, and BD[m] belonging to the picture m is not used for the prediction in such cases. The reason for it is that the picture m not used as a reference picture at all can be discarded in order to control the data volume and lighten the decoding process.

A video predictive encoding program for letting a computer function as the foregoing video predictive encoding device 100 can be provided as stored in a recording medium. Similarly, a video predictive decoding program for letting a computer function as the foregoing video predictive decoding device 200 can be provided as stored in a recording medium. Examples of such recording media include recording media such as flexible disks, CD-ROM, DVD, or ROM, or semiconductor memories or the like.

Figure 13:
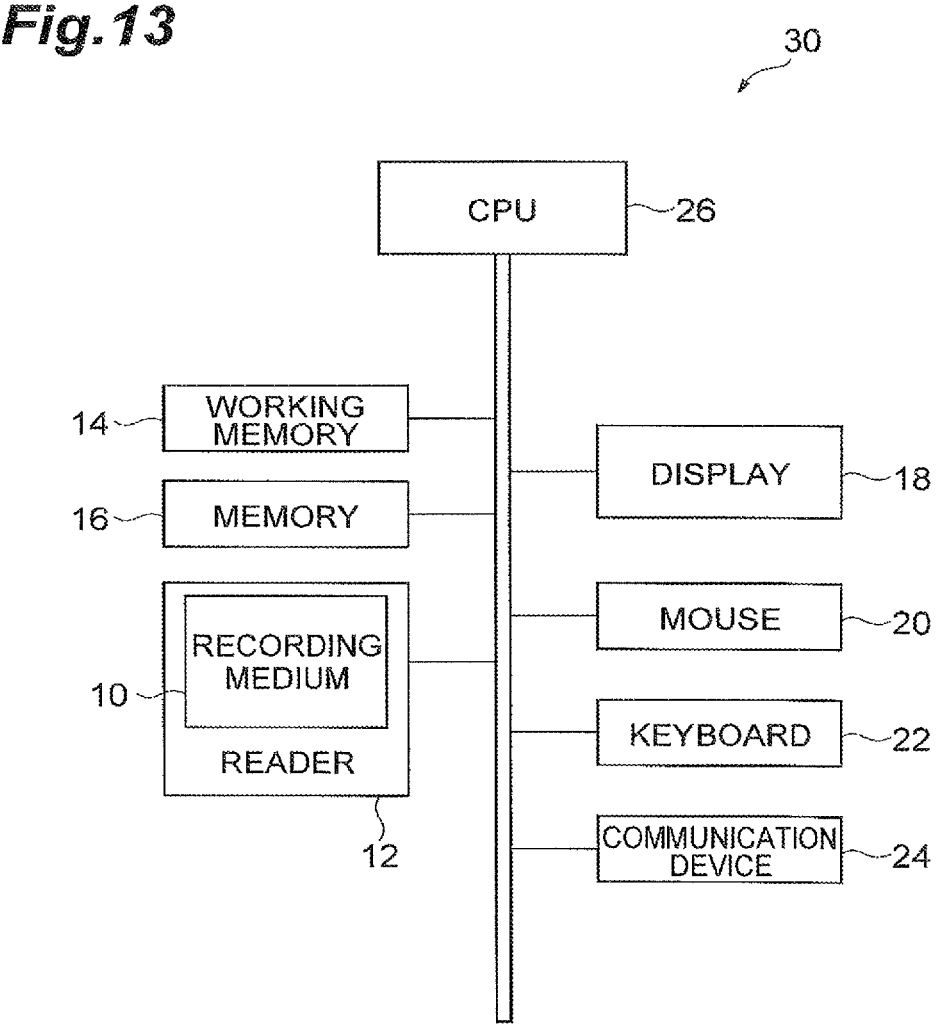
FIG. 13 is a drawing showing an example hardware configuration of a computer.
Figure 14:
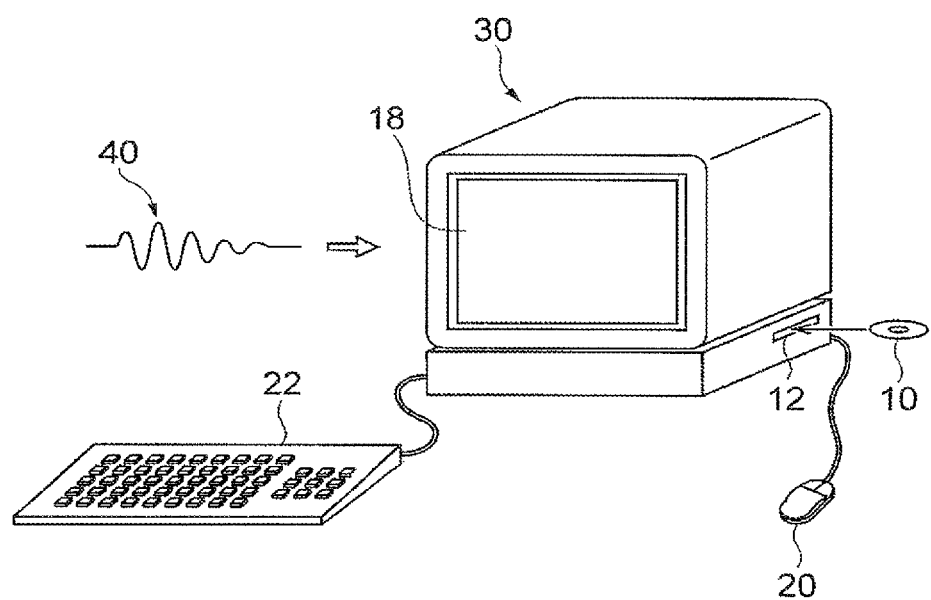
FIG. 14 is a perspective view of an example computer.

FIG. 13 is a drawing showing an example of a hardware circuitry configuration of computer 30 for executing a program recorded in a recording medium, and FIG. 14 is a drawing showing an example of a perspective view of computer 30 for executing a program stored in a recording medium. The example computer 30 herein can generally embrace a DVD player, a set-top box, a cell phone, and other devices provided with circuitry that includes a CPU and is configured to perform information processing and control based on the circuitry or circuitry and software.

As shown in FIG. 13, the computer 30 is provided with circuitry that includes a reading device 12 such as a flexible disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory 14 that may include an operating system, a memory 16 that stores data, such as at least part of a program such as a program stored in the recording medium 10. In addition, the working memory 14 and/or the memory 16 may include the memory 104 and the memory 207. The working memory 14 and memory 16 may be one or more computer readable storage medium that is other than a transitory signal, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer 30 may have user interface circuitry that includes a monitor device 18 such as a display, a mouse 20 and a keyboard 22 as input devices, a touch screen display, a microphone for receipt of voice commands, a sensor, or any other mechanism or device that allows a user to interface with the computer C10. In addition, the circuitry of the computer 30 may include a communication device 24 for transmission and reception of data and others, and a central processing unit (CPU) 26, or processor to control execution of the program. The processor 26 may be one or more one or more general processors, digital signal processors, application specific integrated circuits, field programmable gate arrays, digital circuits, analog circuits, combinations thereof, and/or other now known or later developed circuitry and devices for analyzing and processing data. In an example, when the recording medium 10 is put into the reading device 12, the computer 30 becomes accessible to the video predictive encoding program stored in the recording medium 10, through the reading device 12, and becomes able to operate as the aforementioned video predictive encoding device 100 based on the video predictive encoding program. Similarly, in an example when the recording medium 10 is put into the reading device 12, the computer 30 becomes accessible to the video predictive decoding program stored in the recording medium 10, through the reading device 12, and becomes able to operate as the foregoing video predictive decoding device 200 based on the video predictive decoding program.

LIST OF REFERENCE SIGNS

100: video predictive encoding device; 101: input terminal; 102: block division unit; 103: predicted signal generation unit; 104: frame memory (or buffer, DPB); 105: subtraction unit; 106: transform unit; 107: quantization unit; 108: inverse quantization unit; 109: inverse transform unit; 110: addition unit; 111: entropy encoding unit; 112: output terminal; 114: buffer management unit; 200: video predictive decoding device; 201: input terminal; 202: data analysis unit; 203: inverse quantization unit; 204: inverse transform unit; 205: addition unit; 206: output terminal; 207: frame memory; 208: predicted signal generation unit; 209: buffer management unit.

What is claimed is:

1. A video predictive decoding method executed by a video predictive decoding device, comprising:

an input step of inputting (i) picture data in a compressed form for reproduction of a target picture[k], the picture data resulting from execution of predictive coding, using a first set of reference pictures, on the target picture[k] and (ii) buffer description information BD[k] in a compressed form which describes the first set of reference pictures used to predictively encode the target picture[k], wherein the first set of reference pictures are described in the buffer description information BD[k] with their identification numbers relative to identification numbers of a second set of reference pictures described in buffer description information BD[m] which are used to reproduce another target picture [m] different from the target picture [k];

a reconstruction step of decoding the picture data to reproduce the target picture[k];

a picture storage step of storing the reproduced target picture [k] as a reference picture to be used for decoding of a subsequent target picture; and a buffer management step of controlling the picture storage step, the buffer management step comprising:

prior to reproduction of the target picture[k], referencing the buffer description information BD[m] to restore the identification numbers of the first set of reference pictures;

decoding the target picture [k] using the first set of restored reference pictures of the buffer description information BD[k] whose identification numbers are restored; and controlling the picture storage step on the basis of the decoded buffer description information BD[k], wherein referencing the buffer description information BD[m] to restore the identification numbers of the first set of reference pictures described in the buffer description information BD[k] comprises:

restoring an index m identifying the buffer description information BD[m], restoring a value of deltaBD representing a difference between identification numbers corresponding reference pictures described in the buffer description information BD[m] and the buffer description information BD[k], restoring a plurality of flags ibd_flag[j] each adapted to take multiple values one of which is indicative of both:
  (a) whether or not an identification number of a j-th reference picture described in the buffer description information BD[m] is used for restoration of an identification number of a reference picture described in the buffer description information BD[k]; and
  (b) whether or not the j-th reference picture described in the buffer description information BD[m] is used for reproduction of the target picture[k], and restoring the identification numbers of the first set of reference pictures described in the buffer description information BD[k] based on the restored index m, the restored value of deltaBD and the restored flags ibd_flag[j].

2. The video predictive decoding method according to claim 1, wherein the total number of the flags ibd_flag[j] is equal to the total number of the second sets of reference pictures described in the buffer description information BD[m] plus 1.

* * * * *